(12) United States Patent
Oliver

(10) Patent No.: US 6,322,232 B1
(45) Date of Patent: Nov. 27, 2001

(54) QUICK CONNECT LIGHT FIXTURE

(75) Inventor: John P. Oliver, Memphis, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 09/589,022

(22) Filed: Jun. 7, 2000

(51) Int. Cl.[7] ....................................... F21S 8/00
(52) U.S. Cl. .................. 362/147; 362/404; 362/226; 362/234; 362/96; 362/457; 416/5
(58) Field of Search ................................. 362/147, 457, 362/404, 226, 234, 249, 96; 416/5; 439/13

(56) References Cited

U.S. PATENT DOCUMENTS

| 1,412,748 | 4/1922 | McKay . | |
|---|---|---|---|
| 3,218,448 | 11/1965 | Cala . | |
| 3,798,584 | 3/1974 | Person | 339/14 R |
| 4,219,870 | 8/1980 | Haraden et al. | 362/226 |
| 4,222,093 | 9/1980 | Garcia et al. | 362/147 |
| 4,300,188 | 11/1981 | Addario | 362/226 |
| 4,368,506 | 1/1983 | Rapp | 362/147 |
| 4,449,168 | 5/1984 | Ewing | 362/404 |
| 4,837,669 | 6/1989 | Tharp et al. | 362/418 |
| 4,929,187 | 5/1990 | Hudson et al. | 439/334 |
| 5,341,276 | 8/1994 | Shen | 362/226 |
| 5,351,174 | 9/1994 | Ewing | 362/226 |
| 5,562,341 | 10/1996 | Strauss | 362/226 |
| 5,727,865 | 3/1998 | Caldwell | 362/80 |

Primary Examiner—Thomas M. Sember
Assistant Examiner—Ali Alavi
(74) Attorney, Agent, or Firm—Baker, Donelson, Bearman & Caldwell

(57) ABSTRACT

A quick connect light fixture is provided which may be used in conjunction with and attached to a ceiling fan, or alternatively may comprise a ceiling-mounted light fixture or a wall-mounted sconce. The light fixture includes an adapter plate, which may be mounted to a structure such as a substantially flat lower surface of a ceiling fan switch housing, with the structure varying with application, and an electrical connector secured to the plate. The fixture further includes an open-ended bracket and a second, mating electrical connector secured thereto. The plate includes a pair of flanges which are configured to define a channel and the bracket includes a pair of sidewalls having a first portion integral with a web separating the sidewalls and a second portion terminating in a lip. The lips of the bracket slidingly engage the flanges of the adapter plate with a distal portion of each lip being disposed within one of the channels defined by the adapter plate flanges, whereby the mating electrical connectors engage one another. The light fixture further includes a hollow rod threaded into the bracket at one end thereof A locking member is also threaded onto the hollow rod so that a locking force is exerted between the lips of the sidewalls of the bracket and the flanges of the adapter plate.

42 Claims, 31 Drawing Sheets

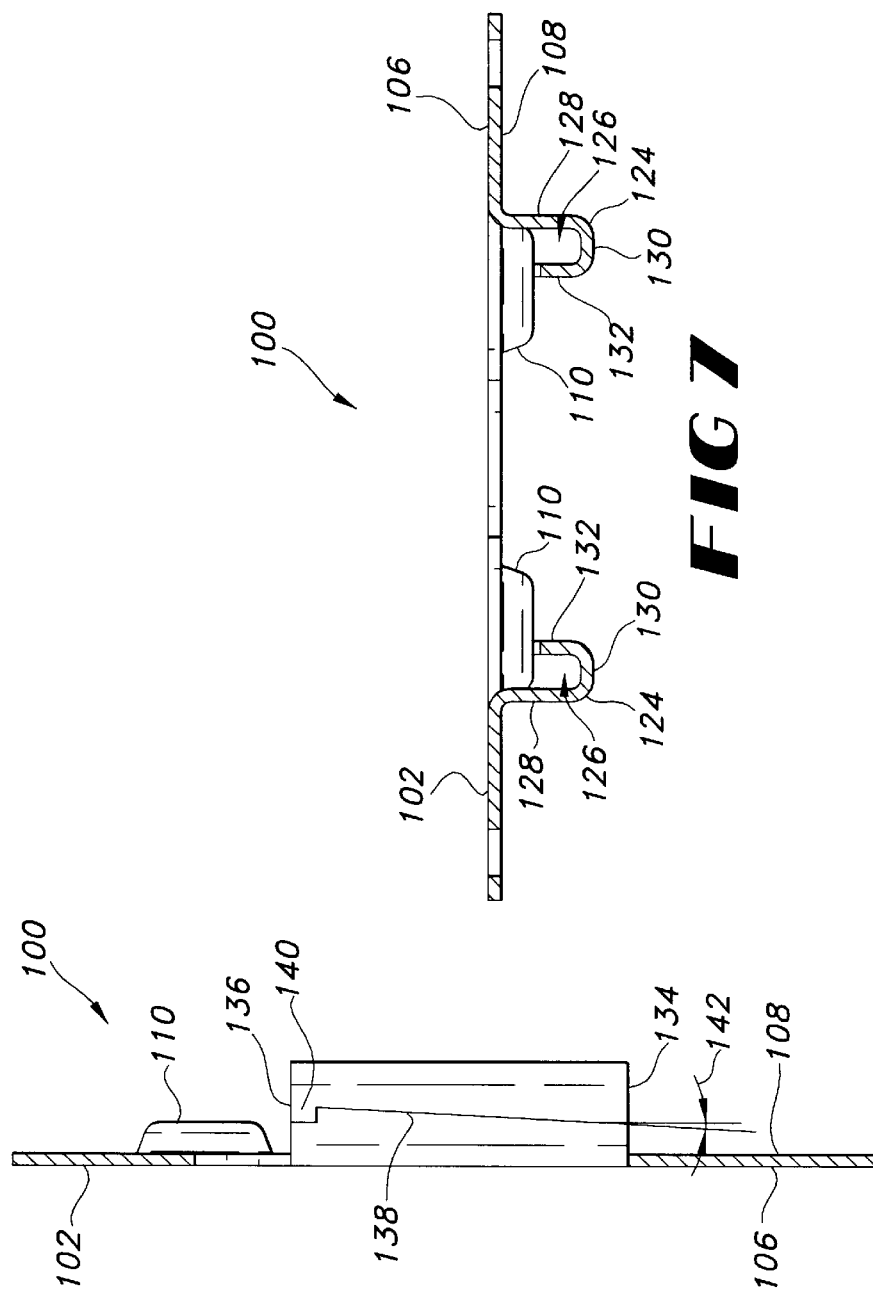

QUICK CONNECT LIGHT FIXTURE

BACKGROUND

1.0 Field of the Invention

The present invention relates generally to light fixtures and, more particularly to light fixtures which may be used in conjunction with ceiling fans, or alternatively which may comprise ceiling-mounted light fixtures or wall-mounted sconces.

2.0 Related Art

The current method of installing light fixtures to ceiling fans, ceilings or walls typically involves many steps. These steps include turning off the power to the electrical circuit in which the fixture is to be installed, connecting the wires of the circuit to those of the light fixture, and attaching the light fixture to the ceiling fan, ceiling or wall of a structure by means of fasteners such as screws. This process is time consuming and, in some instances, may require the assistance of an electrician. Furthermore, if the user wishes to replace the light fixture to change the decor in the room in which the fixture is installed, or due to damage to the light fixture, the foregoing steps must be repeated.

Although various attempts have been made to provide "quick connect" light fixtures to facilitate the electrical coupling of the light fixture to the circuit in which the fixture is installed, these devices typically are relatively complex and therefore costly, and may include other disadvantages. For instance, U.S. Pat. No. 1,412,748 issued to McKay, discloses an Electrical Ceiling Fitting Connection. McKay states that a principal object of the invention is to provide a connection for supporting ceiling fixtures which will enable the use of permanent wiring connections to which the fixture may be readily attached and the electrical connection made instantaneously whereby the splicing of wires and the dangers resulting from improper connections is eliminated. However, the McKay device is relatively complex due to the configuration of the multiple included insulation blocks and other required components and also includes a locking feature provided by a spring latch member which may not securely hold the included electrical connectors to one another in a vibration environment such as that associated with a combined ceiling fan and light fixture unit. Additionally, it appears that the McKay device does not include a safety ground and therefore would not comply with current safety agency standards.

Another example of a conventional light fixture is disclosed in U.S. Pat. No. 4,449,168 issued to Ewing. Ewing discloses a quick install device for mounting a luminaire on a flat surface such as a ceiling, a wall or the like. In the preferred embodiment, the device comprises a mounting plate which is fixedly attached to an existing outlet box in the ceiling or wall and a luminaire plate which is fixedly attached to the luminaire. Ewing indicates that the luminaire plate and the mounting plate contain means for quickly attaching the two plates together. However, electrical "quick connect" connectors are not provided, but instead, the luminaire plate and mounting plate serve as a splice chamber when attached for containing the electrical splices used in electrically connecting the luminaire to an electrical circuit. Accordingly, an electrician may be required to accomplish the necessary splicing for initial installation and if it is desired to later remove or replace the light fixture. Additionally, the mounting arrangement of the Ewing device is not suitably secure for use in a vibration environment such as that associated with a combined ceiling fan and light fixture unit.

In view of the foregoing disadvantages associated with known light fixtures, there remains a need for a simple, easy to install quick connect light fixture having application for use with a ceiling fan or as a ceiling or wall mounted light fixture, in which the included electrical connectors are safely secured to one another even in a vibration environment such as that associated with a combined ceiling fan and light fixture unit.

SUMMARY

In view of the foregoing needs, the present invention is directed to a quick connect light fixture which is aesthetically pleasing and has several functional advantages associated with the installation and locking features of the light fixture. The quick connect light fixture of the present invention has a variety of applications, including the retrofitting of existing ceiling fans to provide a combined ceiling fan and light kit, use with new ceiling fans, or alternatively application as a ceiling mounted light fixture or a wall sconce. In each instance, the quick connect light fixture of the present invention may include a variety of configurations which gives the end user a wide variety of choices to complement the decor of the structure in which the quick connect light fixture is installed. With each configuration, the quick connect light fixture of the present invention includes mating electrical connectors which are designed for "quick connect" coupling in a simple, safe and reliable manner, thereby eliminating the need for an electrician's assistance in many instances. Furthermore, the various features of the quick connect light fixture of the present invention, permits an end user to simply, safely and quickly disconnect and remove a portion of the light fixture for bulb replacement as required, or to change the appearance of the light fixture, for instance for special occasions. The particular elements of the quick connect light fixture to which the electrical connectors are attached, have mating flanges which slidingly engage one another for ease of installation, and the light fixture of each embodiment includes a locking member which secures the structures supporting the electrical connectors to one another.

In each embodiment, the quick connect light fixture of the present invention is adapted for mounting to a structure, with the light fixture comprising an adapter plate, an open-ended bracket, a first electrical connector secured to the adapter plate and a second electrical connector secured to the open-ended bracket. The adapter plate includes a first portion having first and second opposite surfaces and further includes a pair of flanges spaced apart from one another and protruding from the first portion of the plate, with each of the flanges being configured to define a channel. An aperture extends through the first portion of the plate between the flanges and is effective for receiving a plurality of electrical wires coupled to the first electrical connector. In one embodiment, with particular application for new ceiling fans, the adapter plate of the quick connect light fixture may be integrally formed with a switch housing of the ceiling fan. In other embodiments having application for retrofitting ceiling fans, the adapter plate is affixed to the switch housing of the ceiling fan such that the first surface of the first portion of the adapter plate is facing a substantially flat lower surface of the switch housing. In other embodiments, having application as a ceiling-mounted light fixture or a wall sconce the adapter plate may be disposed adjacent to a junction box cover plate which in turn is disposed adjacent to and attached to a junction box in the ceiling or wall of the structure.

The open-ended bracket has a web and a pair of sidewalls, with each of the sidewalls having a proximal portion integral with the web and a distal portion which comprises a lip, with the sidewalls and web defining a cavity, and the second electrical connector being disposed in the cavity. The light fixture further includes a hollow rod secured to the bracket and a second plurality of electrical wires electrically coupled to the second electrical connector and extending thorough the hollow rod. Preferably, the first electrical connector comprises a female electrical connector, while the second electrical connector comprises a male electrical connector. Both the male and female electrical connectors include a housing with a plurality of electrical terminals disposed therein, with each of the housings including a plurality of lead-in chamfers to facilitate engagement of the male and female electrical connectors with one another.

The lips of the sidewalls of the bracket slidingly engage the flanges of the adapter plate, with a distal portion of the lips of the sidewalls being disposed within the channels defined by the flanges, whereby the male electrical connector engages the female electrical connector. The quick connect light fixture further includes a locking member disposed in surrounding relationship with and releasably secured to the hollow rod. The locking member is threaded onto the hollow rod which creates a locking force between the lips of the sidewalls of the bracket and the flanges of the adapter plate when the locking member is in an installed position thereby preventing the bracket from moving relative to the adapter plate and securely locking these parts in position until such time that the end user wishes to disconnect and remove a portion of the light fixture for bulb replacement, etc.

The mating portions of the adapter plate and the open-ended bracket are configured to assist the end user with the installation thereof, due to the action of gravity acting on these parts. More particularly, the lip of each of the sidewalls of the open-ended bracket is tapered relative to the web of the open-ended bracket and each of the flanges of the adapter plate includes a tapered portion, which is tapered relative to the first surface of the adapter plate. The tapered portion engages the tapered lip of the open-ended bracket. In one preferred embodiment, each of the flanges of the adapter plate has a generally J-shaped cross-section and comprises a first sidewall which extends downwardly, in those embodiments where the quick connect light fixture is used in conjunction with a ceiling fan or is mounted to a ceiling, from the first portion of the adapter plate and a web which is integral with the first sidewall and extends transversely to the first sidewall. Each of the flanges of the adapter plate further includes a second sidewall spaced apart from the first sidewall, with the second sidewall being integral with and extending upwardly from the web, again when the light fixture is used in conjunction with a ceiling fan or is attached to a ceiling. Each of the flanges of the adapter plate further includes first and second ends and the second sidewall of each of the flanges includes an upper edge which is configured to define a shoulder proximate the second end of the corresponding one of the flanges. The shoulder is disposed in abutting relationship with the lip of one of the sidewalls of the open-ended bracket and defines a downward taper between the first end and the shoulder. This taper ranges from about three degrees to about ten degrees in a preferred embodiment, and each of the lips of the open-ended bracket has a taper which substantially matches that of the flanges of the adapter plate.

In each of the embodiments where the quick connect light fixture of the present invention is attached to a ceiling fan, so as to form a combined ceiling fan and light fixture, the light fixture is preferably attached to a switch housing of the ceiling fan. More particularly, either the adapter plate of the quick connect light fixture comprises an integral portion of the switch housing or is fastened to the switch housing whereby the first surface of the first portion of the adapter plate is disposed in contacting engagement with a substantially flat lower surface of the switch housing, as discussed previously. The quick connect light fixture of the present invention may assume a variety of configurations for the foregoing applications when the light fixture is attached to a ceiling fan, as discussed in the following paragraphs.

In one such embodiment, the quick connect light fixture of the present invention may comprise a multi-arm light fixture. In this embodiment, the locking member comprises a canopy which serves the dual purpose of locking the adapter plate and open-ended bracket to one another and to further provide an aesthetically pleasing appearance of the light fixture by obscuring the adapter plate and open-ended bracket from view when the canopy is disposed in an installed position. The canopy includes a shell portion which defines an interior cavity and a receptacle portion integral with the shell portion and disposed within the interior cavity. The receptacle is configured to permit the hollow rod to extend therethrough, and includes a threaded portion for threadedly engaging the hollow rod. The canopy may have a generally bell-shaped cross-section, and may include various ornamental designs disposed about the outer surface of the canopy. In one preferred embodiment, the hollow rod includes first and second threaded portions spaced apart from one another and separated by a non-threaded portion. The threaded portion of the receptacle of the canopy is disposed in surrounding relationship with the non-threaded portion of the hollow rod when the canopy is in a pre-installed position, and engages the first threaded portion of the rod when the canopy is disposed in an installed position. The second threaded portion of the hollow rod is threadedly attached to a distributor of the light fixture. The light fixture further includes at least one light globe and at least one hollow mount arm having a first portion connected to and supported by the distributor and a second portion connected to and supporting the light globe. With this configuration, the quick connect light fixture may comprise a plurality of the light globes and an equal number of the hollow mount arms, with each arm being connected to and supporting one of the light globes. Also, with this configuration, the quick connect light fixture may further include a hollow sleeve disposed in surrounding relationship with the hollow rod and extending between the canopy and the distributor, wherein the sleeve extends into the receptacle of the canopy when the canopy is disposed in both the pre-installed and installed positions to further provide an aesthetically pleasing appearance of the quick connect light fixture.

In other embodiments where the quick connect light fixture is attached to a ceiling fan, the quick connect light fixture may further include a canopy, in addition to and separate from the locking member. In these embodiments, the canopy is disposed between and in abutting relationship with the switch housing of the ceiling fan and the locking member. The locking member forces the canopy into contacting engagement with the switch housing of the ceiling fan when the locking member is threaded onto the hollow rod and is disposed in an installed position, whereby the canopy obscures the adapter plate and open-ended bracket from view. In one such embodiment, wherein the quick connect light fixture comprises a single, upwardly open globe type light fixture, the locking member comprises a hollow sleeve disposed in surrounding relationship with the rod. In this embodiment, the light fixture further includes a light globe and a globe-supporting structure with the hollow rod having a first threaded portion secured to the open-ended bracket and a second threaded portion secured to the globe-supporting structure. The globe is also secured to the globe-supporting structure. In this embodiment, the light globe has an open top and an upper edge which is disposed radially outwardly of the switch housing so as to obscure the switch housing from view by an observer positioned below the ceiling fan. The light fixture further includes a light socket secured to the canopy and disposed within the light globe.

In another embodiment in which the quick connect light fixture is attached to the ceiling fan and includes both a canopy and a locking member, comprising a hollow sleeve disposed in surrounding relationship with the hollow rod, the light fixture comprises a "closed globe" light fixture. In this embodiment, the light fixture further comprises a light socket and a light globe, with the light socket being disposed within the light globe. A first threaded portion of the hollow rod is secured to the open-ended bracket and a second threaded portion of the hollow rod is secured to the light socket. In this embodiment the canopy includes first and second shell portions which are integral with one another, with the light globe being secured to the second shell portion. The first shell portion of the canopy is upwardly facing, whereas the second shell portion of the canopy is downwardly facing and is disposed radially outward of the first shell portion.

In yet another embodiment where the quick connect light fixture is attached to a ceiling fan and the light fixture includes both a canopy and a locking member, a first threaded portion of the hollow rod is secured to the open-ended bracket and a second threaded portion of the hollow rod is secured to the locking member which comprises a finial. In this embodiment, the light fixture further includes a plurality of light fitters secured to and extending outwardly from the canopy and a plurality of light globes, with each of the light globes being secured to one of the light fitters. Each of the light fitters may be staked to the canopy, or otherwise attached to the canopy, for instance by using rivets or bonding agents.

As discussed previously, the quick connect light fixture of the present invention also has application as a ceiling-mounted light fixture and may be attached to a junction box mounted to a ceiling of a residential or commercial structure. In this embodiment, the light fixture may further comprise a junction box cover plate disposed adjacent to the junction box of the structure and a canopy disposed between the locking member and the adapter plate, which may also be referred to as a ceiling plate. The ceiling plate and the junction box cover plate are attached to one another and the cover plate is attached to the junction box of the structure via conventional fasteners. In this embodiment, the locking member forces the canopy into contacting engagement with the ceiling plate when the locking member is threaded onto the hollow rod and is disposed in an installed position whereby the canopy obscures the open-ended bracket and at least a portion of the adapter plate from view. The locking member may comprise a hollow sleeve disposed in surrounding relationship with the hollow rod. In yet other embodiments, it should be understood that the quick connect light fixture may be directly attached to the ceiling of the residential or commercial structure, rather than to a junction box mounted in the ceiling. The quick connect light fixture of the present invention may assume a variety of configurations when attached to a junction box mounted in a ceiling or attached directly to the ceiling, similar to those configurations described previously with respect to the embodiments where the light fixture is attached to the switch housing of a ceiling fan.

In yet another embodiment, the quick connect light fixture of the present invention may comprise a wall sconce and is attached to a junction box mounted to a wall of a residential or commercial structure. In this embodiment, the light fixture may further comprise a junction box cover plate disposed adjacent to the junction box of the structure, with the adapter plate and junction box cover plate being fastened to one another and the cover plate is fastened to the junction box of the structure via conventional fasteners. In yet other embodiments, it should be understood that the quick connect light fixture may be attached directly to the wall of the residential or commercial structure, rather than to a junction box mounted to the wall. In either of the foregoing instances, the quick connect light fixture of the present invention may assume a variety of configurations, similar to those configurations described previously with respect to the embodiments where the light fixture is attached to the switch housing of the ceiling fan. For instance, in one illustrative embodiment, the locking member comprises a canopy which obscures the open-ended bracket and a portion of the adapter plate from view when the canopy is disposed in an installed position. The canopy includes a shell portion which defines an interior cavity and a receptacle portion integral with the shell portion and disposed within the interior cavity. The receptacle is configured to permit the hollow rod to extend therethrough, with the receptacle having a threaded portion for threadedly engaging the hollow rod. In this embodiment, the quick connect light fixture further includes a light fitter and a light globe secured to the fitter, and a hollow mount arm having one end secured to the hollow rod and the other end secured to the light fitter.

BRIEF DESCRIPTION OF THE DRAWINGS

These and other features, aspects, and advantages of the present invention will become better understood with regard to the following description, appended claims and accompanying drawings, wherein:

FIG. 7 is a cross-sectional view taken along line 7—7 in FIG. 6;

FIG. 8 is a cross-sectional view taken along line 8—8 in FIG. 6;

DETAILED DESCRIPTION

Figure 1:
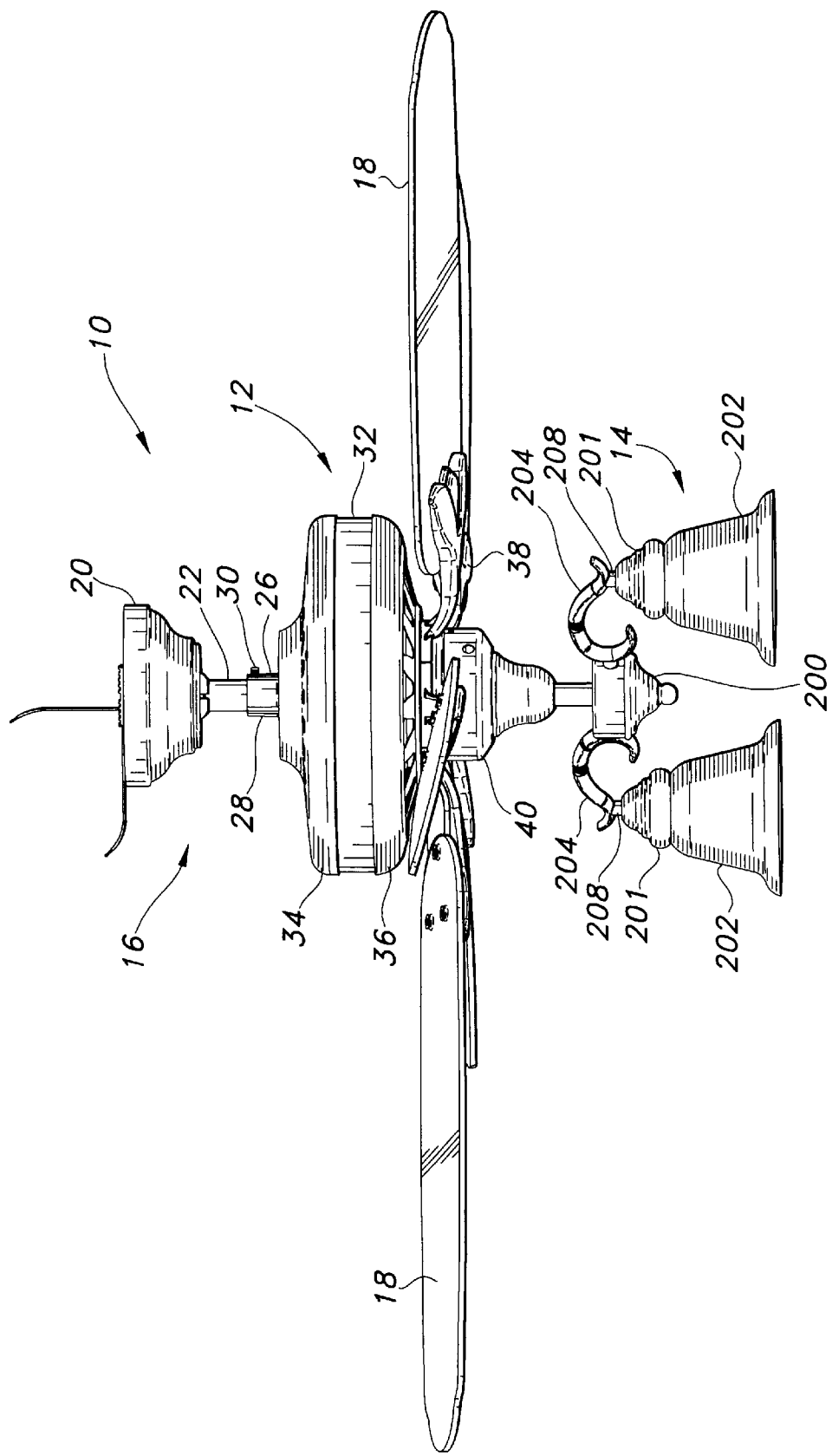
FIG. 1 is an elevational view of a ceiling fan incorporating a quick connect light fixture according to a first embodiment of the present invention.
Figure 2:
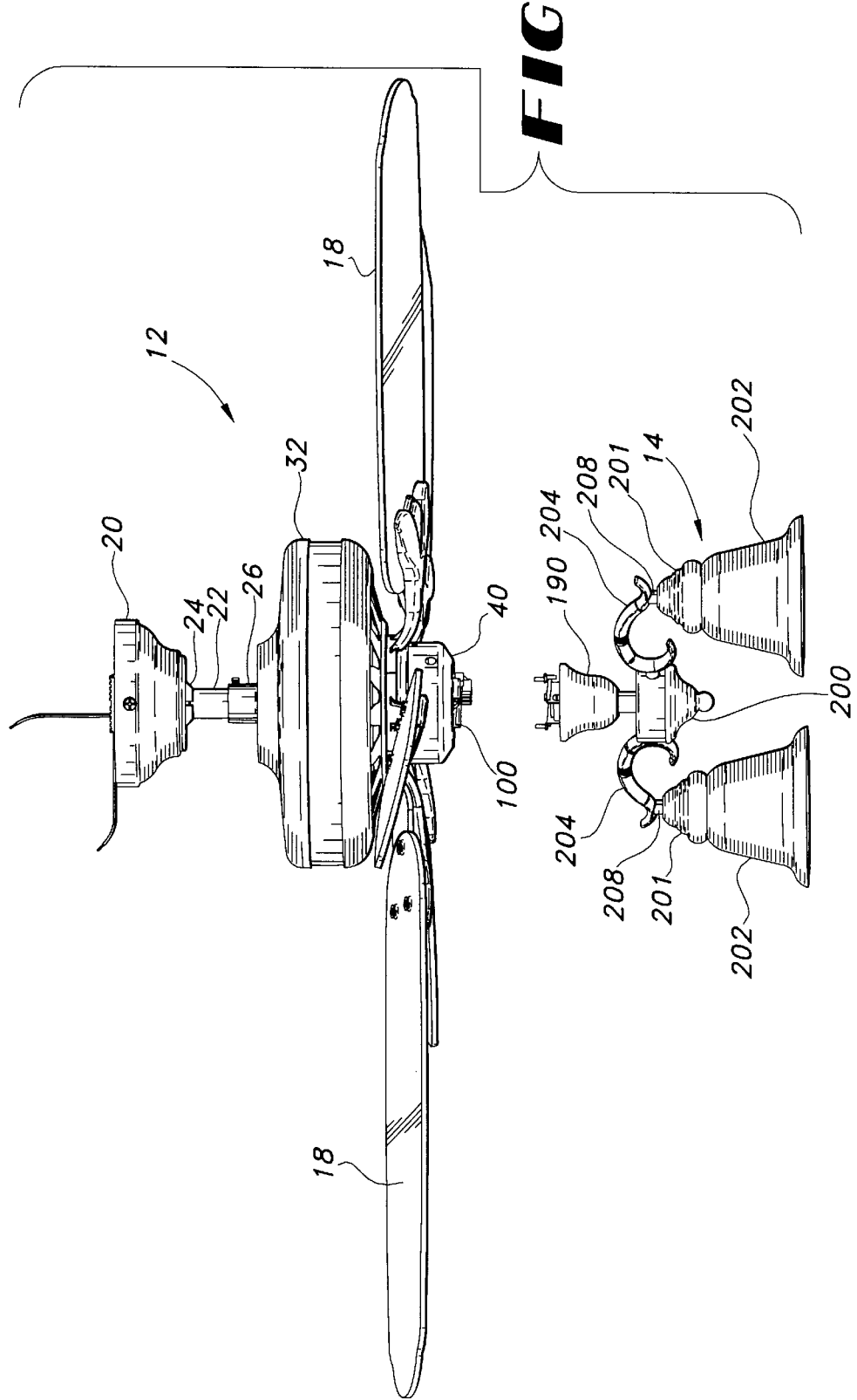
FIG. 2 is an exploded assembly, elevational view of the quick connect light fixture of the present invention and the ceiling fan shown in FIG. 1.
Figure 3:
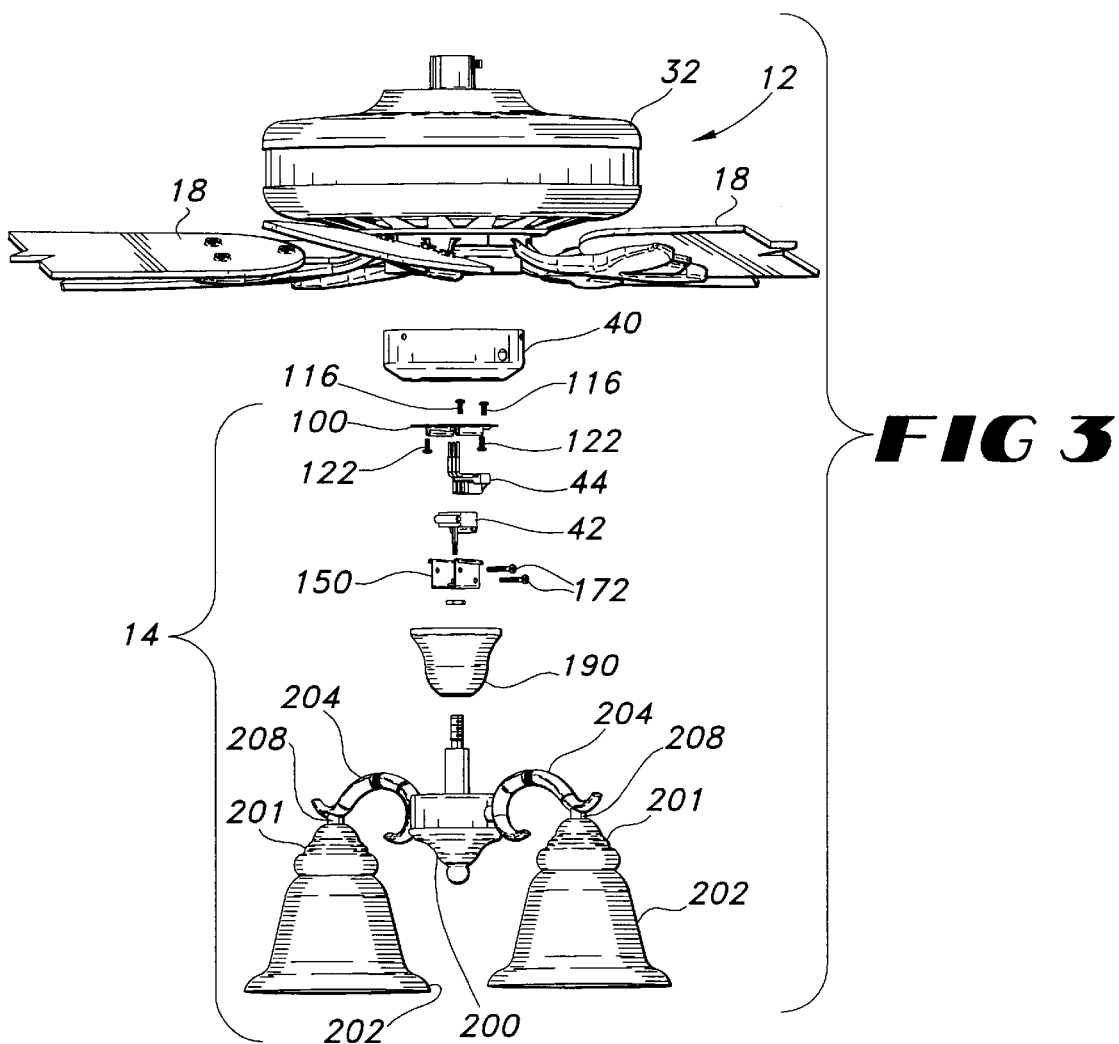
FIG. 3 is yet another exploded assembly, elevational view further illustrating the quick connect light fixture according to the present invention.

Referring now to the drawings, wherein like reference numerals have been used for similar elements throughout, FIG. 1 is an elevational view illustrating a combined ceiling fan and light fixture unit 10, which includes a ceiling fan 12 and a quick connect light fixture 14 according to the present invention, which is secured to the ceiling fan 12 as subsequently discussed. FIG. 2 is an exploded assembly, elevational view showing an adapter plate 100 of quick connect light fixture 14 attached to ceiling fan 12 with the remaining portion of the quick connect light fixture 14 separated from the ceiling fan 12. FIG. 3 is also an exploded assembly, elevational view illustrating various elements of the quick connect light fixture 14, which will be discussed subsequently, separated from one another. Ceiling fan 12 includes a means, indicated generally at 16, for suspending the fan 12 from the ceiling (not shown) of a residential or commercial structure, and further includes an electric motor 25 (partially shown in FIGS. 21 and 22) which is connected to and supported by the means 16 for suspending the fan 12. Ceiling fan 12 further includes a plurality of fan blades 18 which are rotatably driven by the electric motor 25 to provide a supplemental means of conditioning the air within the residential or commercial structure.

In the illustrative embodiment, the means 16 for suspending the ceiling fan 12 includes a bracket which may be attached directly to the ceiling of the structure via fasteners in a manner which is known in the art, and a hollow canopy 20 which is attached to the bracket via fasteners (not shown). The canopy 20 includes a seat (not shown) within a lower end thereof. The means 16 for suspending the ceiling fan 12 further includes a hollow downrod 22, a ball 24 secured to an upper end of the downrod 22, and an adapter 26 which is secured to a lower portion of the downrod 22. The electric motor 25 of ceiling fan 12 includes a rotating portion which may comprise a rotor and upper and lower 27 end caps or end bells, which are attached to the rotor in a conventional manner. The electric motor 25 may further include a stationary stator which includes electrical stator windings and a stator shaft 29. In the illustrative embodiment, the included electric motor of ceiling fan 12 may preferably comprise an inside-out electric motor, with the rotor disposed radially outwardly of the stator. However, in other embodiments, ceiling fan 12 may include standard configuration electric motors, i.e., those in which the stator is disposed radially outwardly of the rotor. Furthermore, the particular configuration of the electric motor of ceiling fan 12 does not constitute a part of the present invention.

The ball 24 is secured to an upper end of the downrod 22 in a conventional manner, and an outer surface of the ball 22 and an inner surface of the seat of canopy 20 have mating shapes to permit the ceiling fan 12 to pivot about ball 24 and the canopy seat to accommodate a vaulted or sloped ceiling, as known in the art.

The adapter 26 may include a radially extending flange portion (not shown) and upper 28 and lower (not shown) substantially cylindrical portions, each having internal threads. The lower end of the downrod 22 is secured to the upper, substantially cylindrical portion 28 of the adapter 26 by threading the lower end of the downrod 22 into the substantially cylindrical portion 28, and may be further secured by one or more set screws 30 which pass through the substantially cylindrical portion 28 and press against the lower end of the downrod 22. The upper end of the stator shaft of the electric motor 25 is secured to the lower, substantially cylindrical portion of adapter 26 in a conventional manner known in the art. For instance, the upper end of the stator shaft may be threaded into the lower, substantially cylindrical portion of adapter 26, and may be further secured by one or more set screws. In the foregoing manner, the means 16 for suspending the ceiling fan 12 provides support to the electric motor 25 and the remainder of the ceiling fan 12.

The ceiling fan 12 further includes a stationary fan housing 32 having an upper portion 34 and a lower portion 36 which are fastened to one another. In some instances, either the upper or lower portions 34 and 36 may be further subdivided so that the fan housing 32 includes upper, lower and center portions. The upper portion 34 of the fan housing 32 is attached to the flange portion of the adapter 26 by a plurality of fasteners (not shown), thereby securing the stationary fan housing 32 to the adapter 26. The fan housing 32 is disposed in surrounding relationship with the electric motor 25 of ceiling fan 12 and may comprise a variety of shapes. Also, the outer surface of fan housing 32 may include various ornamental designs. However, the particular features of fan housing 32 do not constitute a part of the present invention.

Figure 21:
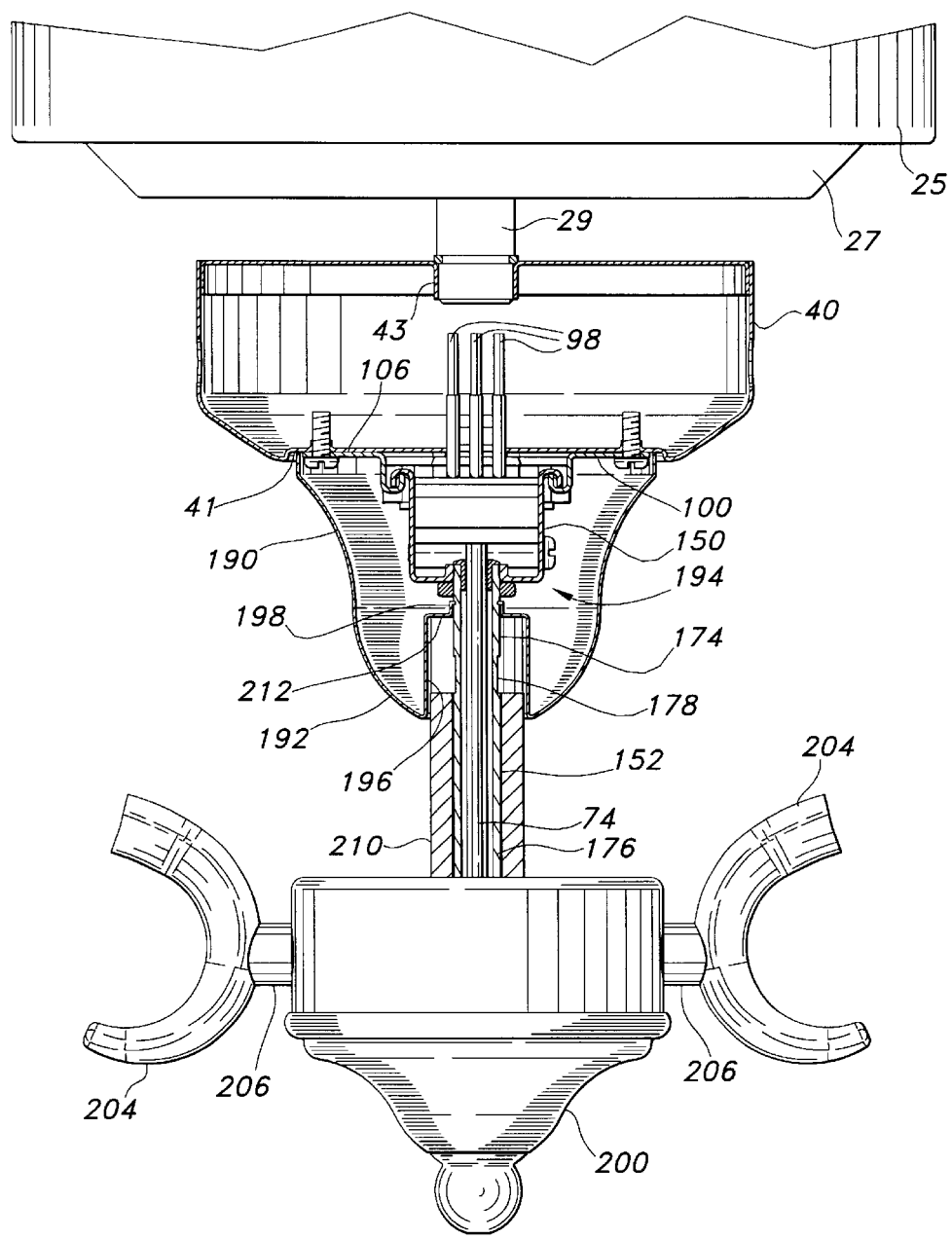
FIG. 21 is a fragmentary elevational view, partially in cross-section, further illustrating the quick connect light fixture shown in FIGS. 1–20.
Figure 22:
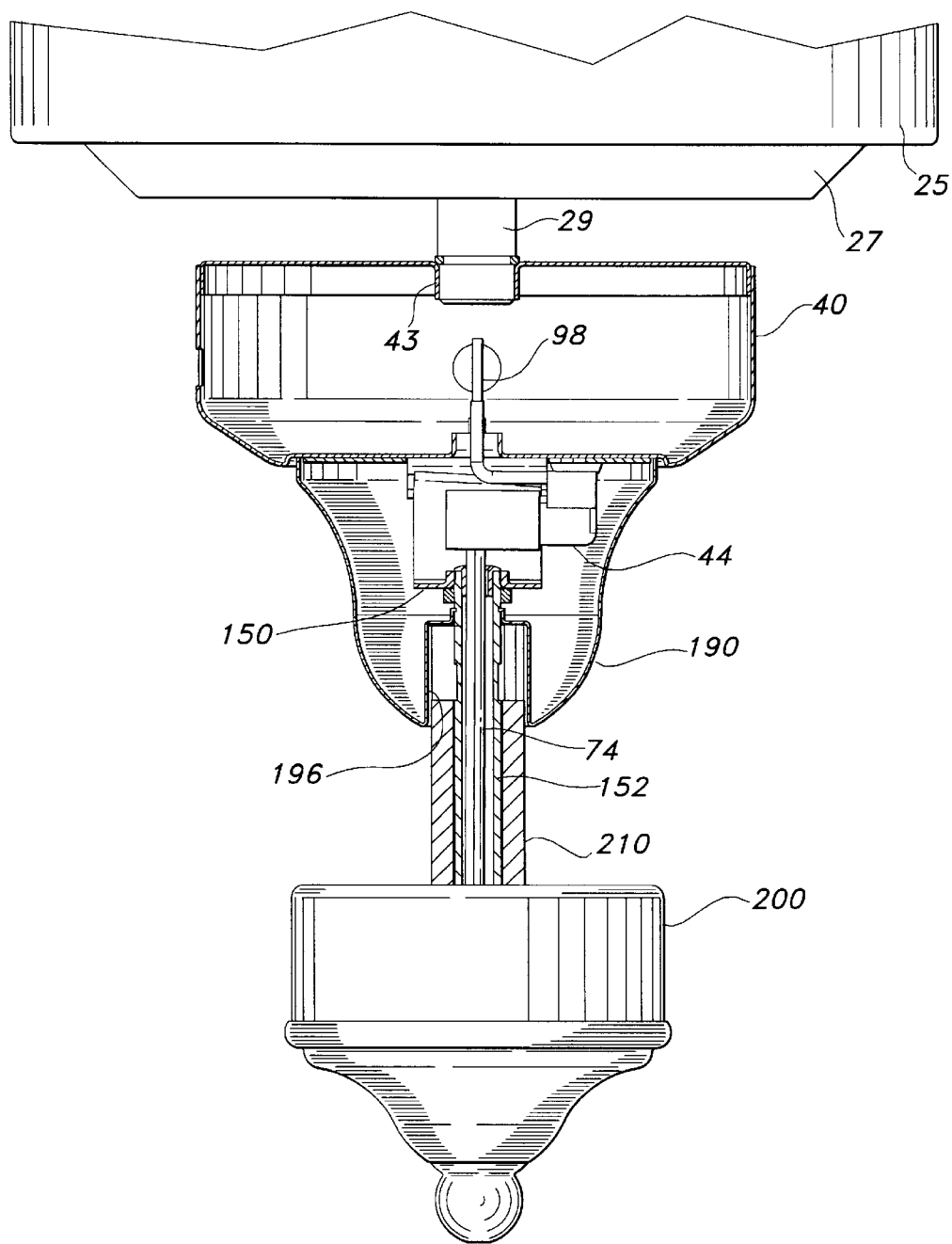
FIG. 22 is another fragmentary elevational view, partially in cross-section, further illustrating the quick connect light fixture shown in FIGS. 1–21.

Each of the fan blades 18 is connected to a rotating portion of the electric motor 25 of ceiling fan 12, for rotation therewith, via a blade iron 38. Ceiling fan 12 further includes a switch housing 40, which may be supported in a conventional manner by a lower end of the stator shaft 29 of the electric motor 25 of ceiling fan 12, as shown in FIGS. 21 and 22. For instance, the lower end of stator shaft 29 may be threaded into a cylindrical portion 43 of the switch housing 40. Switch housing 40 contains electrical wires (not shown) which are connected to the source of electrical power in the residential or commercial structure in which ceiling fan 12 is suspended, and conventional switches (not shown) which are known in the art, to control the operation of fan 12, including the speed and direction of the included electric motor 25 and fan blades 18. The electrical wires comprising the source of electrical power in the structure are typically routed to a junction box, and may then be spliced with wires contained within the hollow canopy 20. These wires are then routed downward through the canopy 20, the hollow downrod 22 and the hollow stator shaft of the electric motor 25. The electric wires exit from the lower end of the stator shaft of the motor 25 into the interior of the switch housing 40, and may then be connected to the various included switches as required to control the operation of ceiling fan 12.

Figure 4:
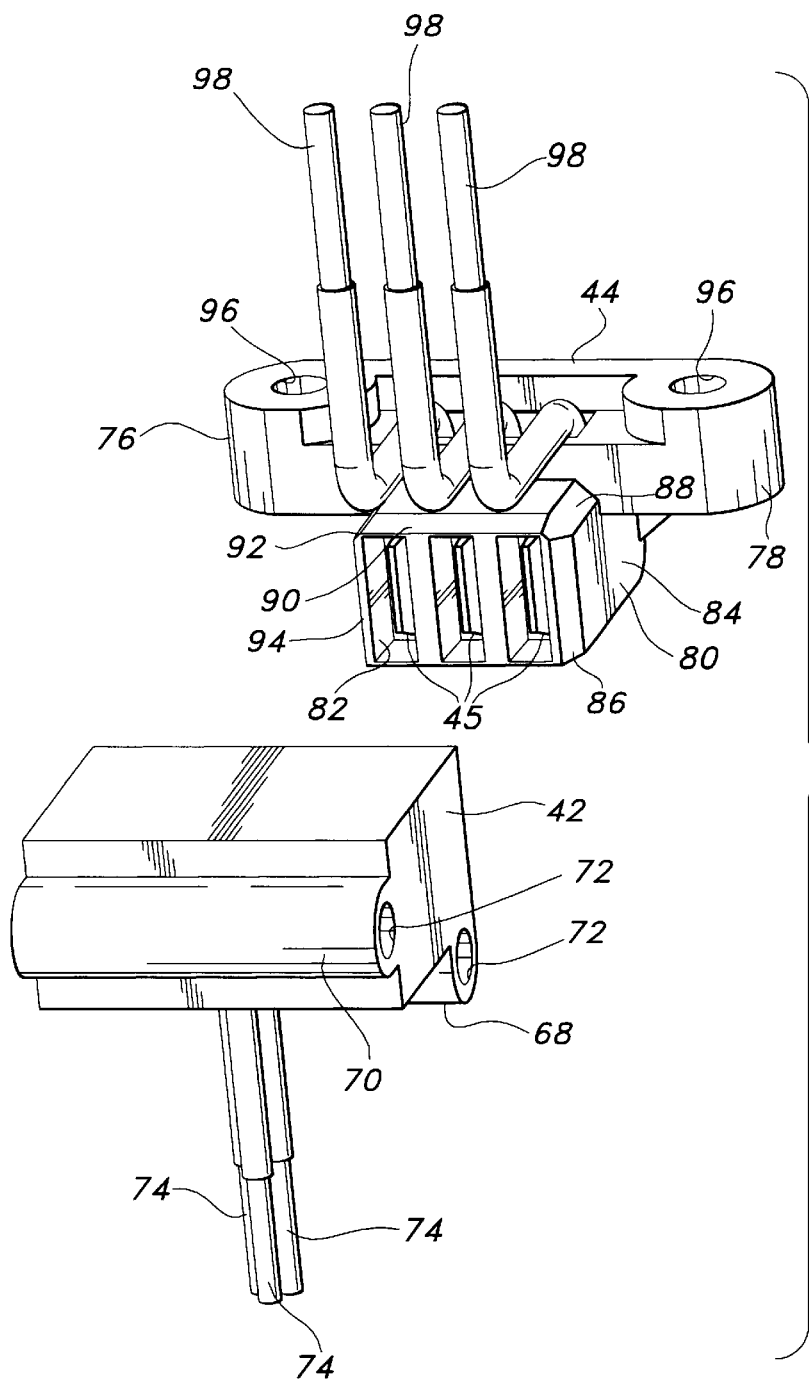
FIG. 4 is an exploded assembly, perspective view illustrating the female and male electrical connectors included in the quick connect light fixture of the present invention.
Figure 5:
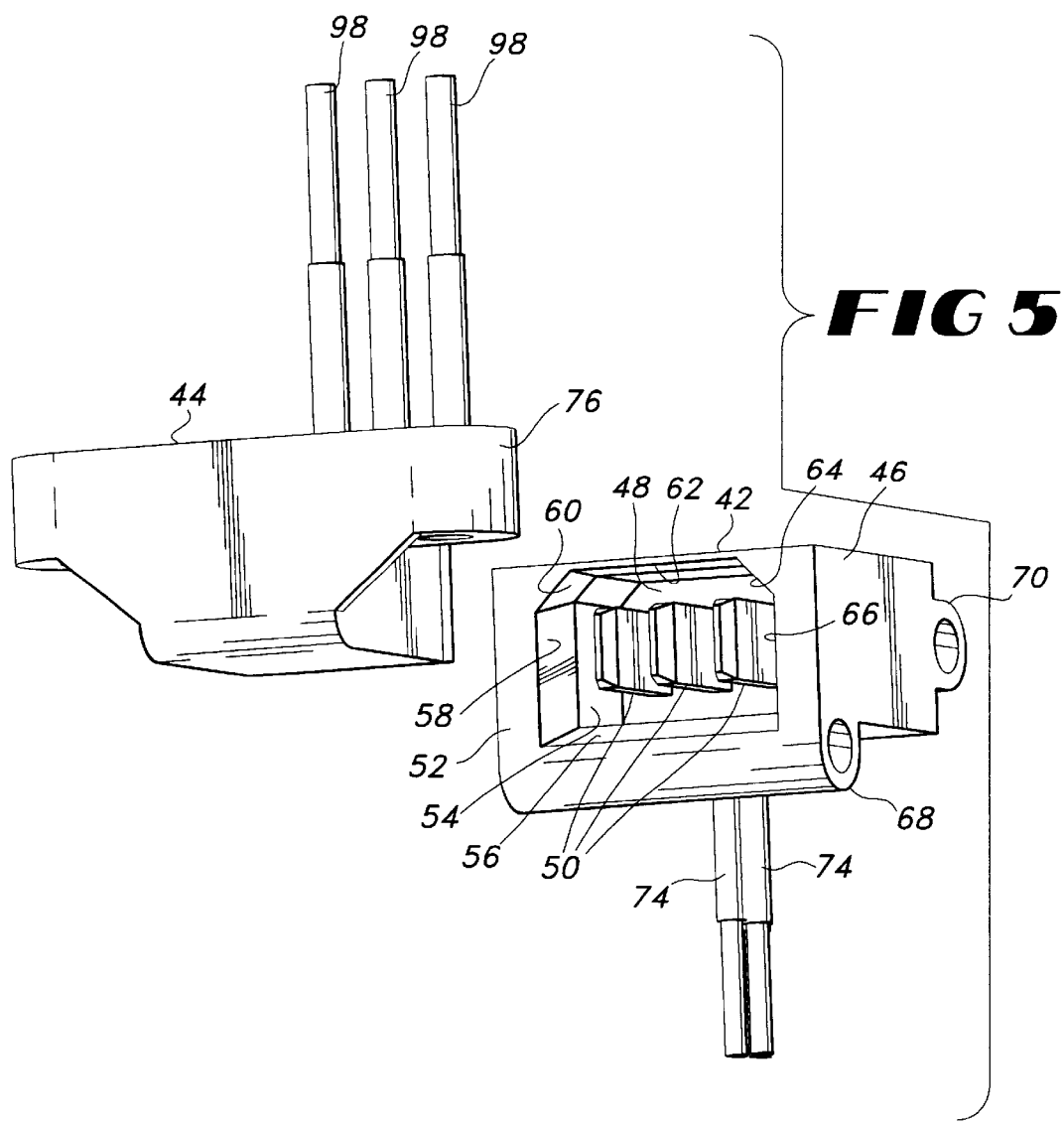
FIG. 5 is another exploded assembly, perspective view further illustrating the electrical connectors shown in FIG. 4.

Referring now to FIGS. 4 and 5, the quick connect light fixture 14 of the present invention includes a male electrical connector 42 and a female electrical connector 44 which engage one another, as subsequently described, so as to provide electrical power from the wiring present within switch housing 40 to the light bulbs (not shown) included in fixture 14. The male electrical connector 42 includes a housing 46, made of a material which does not conduct electricity, such as plastic, for functional and safety considerations. The housing 46 defines an interior cavity 48. Connector 42 further includes a plurality of male electrical terminals 50 disposed within the interior cavity 48. For safety considerations, the male terminals 50 do not protrude beyond a front surface 52 of housing 46. As shown in FIG. 5, the housing 46 includes an interior surface 54 and a plurality of lead-in chamfers formed on the interior surface 54 and extending from the front surface 52 of housing 46. These lead-in chamfers are identified as chamfers 56, 58, 60, 62, 64 and 66 (only one edge of chamfer 66 is shown in FIG. 4), with the foregoing connectors facilitating the engagement of the male electrical connector 42 with the female electrical connector 44.

The housing 46 of the male electrical connector 42 also includes first 68 and second 70 protruding portions which are used to mount the male electrical connector 42 as subsequently discussed. Protruding portions 68 and 70 each include a hole 72 extending therethrough for the purpose of receiving a fastener, such as a screw or bolt to mount the male electrical connector 42. Depending upon the particular fastener used, hole 72 may comprise either a non-threaded clearance hole or, alternatively, a tapped, threaded hole.

The quick connect light fixture 14 further includes a plurality of wires 74, comprising three of the wires 74 in the illustrative embodiment, which are electrically coupled to the male electrical connector 42. More particularly, each of the wires 74 is connected, at one end thereof, to one of the male electrical terminals 50. The wire 74 which is connected to the center terminal 50 is a ground wire. The center terminal 50 is preferably somewhat longer than the other two terminals 50, so it is first to make contact with the corresponding one of the subsequently discussed female electrical terminals 45 of female electrical connector 44, and the last to break contact with the corresponding female electrical terminal 45, for safety considerations.

The female electrical connector 44 includes a housing 76 having a first, mount portion 78 and a second, terminal-receiving portion 80, as best seen in FIG. 4. Similar to housing 46 of connector 42, the housing 76 of connector 44 is made of a material which does not conduct electricity, such as plastic, for functional and safety considerations. The female electrical connector 44 includes a plurality of female electrical terminals 45 which are disposed within an interior cavity defined by the terminal-receiving portion 80 of housing 76. In the illustrative embodiment, connector 44 includes three of the female electrical terminals, with each one mating with one of the male electrical terminals 50 of the male electrical connector 42, when connectors 42 and 44 are fully engaged with one another.

The female electrical connector 44 further includes a plurality of lead-in chamfers formed in an outer surface 84 of the terminal-receiving portion 80 of housing 76. These lead-in chamfers are identified as chamfers 86, 88, 90, 92 and 94 (only one edge of chamfer 94 is shown in FIG. 4) and function to facilitate the engagement of the female electrical connector 44 with the male electrical connector 42.

The mount portion 78 of housing 76 includes a plurality of holes 96 extending therethrough for the purpose of receiving fasteners used to mount the female electrical connector 44 as subsequently discussed. Depending upon the type of fasteners used, holes 96 may comprise either non-threaded clearance holes or alternatively, may comprise tapped, threaded holes. A plurality of electrical wires 98 are electrically coupled to connector 44. More particularly, each of the wires 98 is electrically coupled, at one end thereof, to one of the female electrical terminals disposed within housing 76. As shown in FIG. 4, each of the wires 98 enters connector 44 through an opening formed in the mount portion 78 of housing 76. Additionally, each of the electrical wires 98 are electrically coupled or connected, at an opposite end thereof, to wires contained within the switch housing 40 which are electrically connected to the electrical power source available in the structure in which fan 12 is installed.

Figure 6:
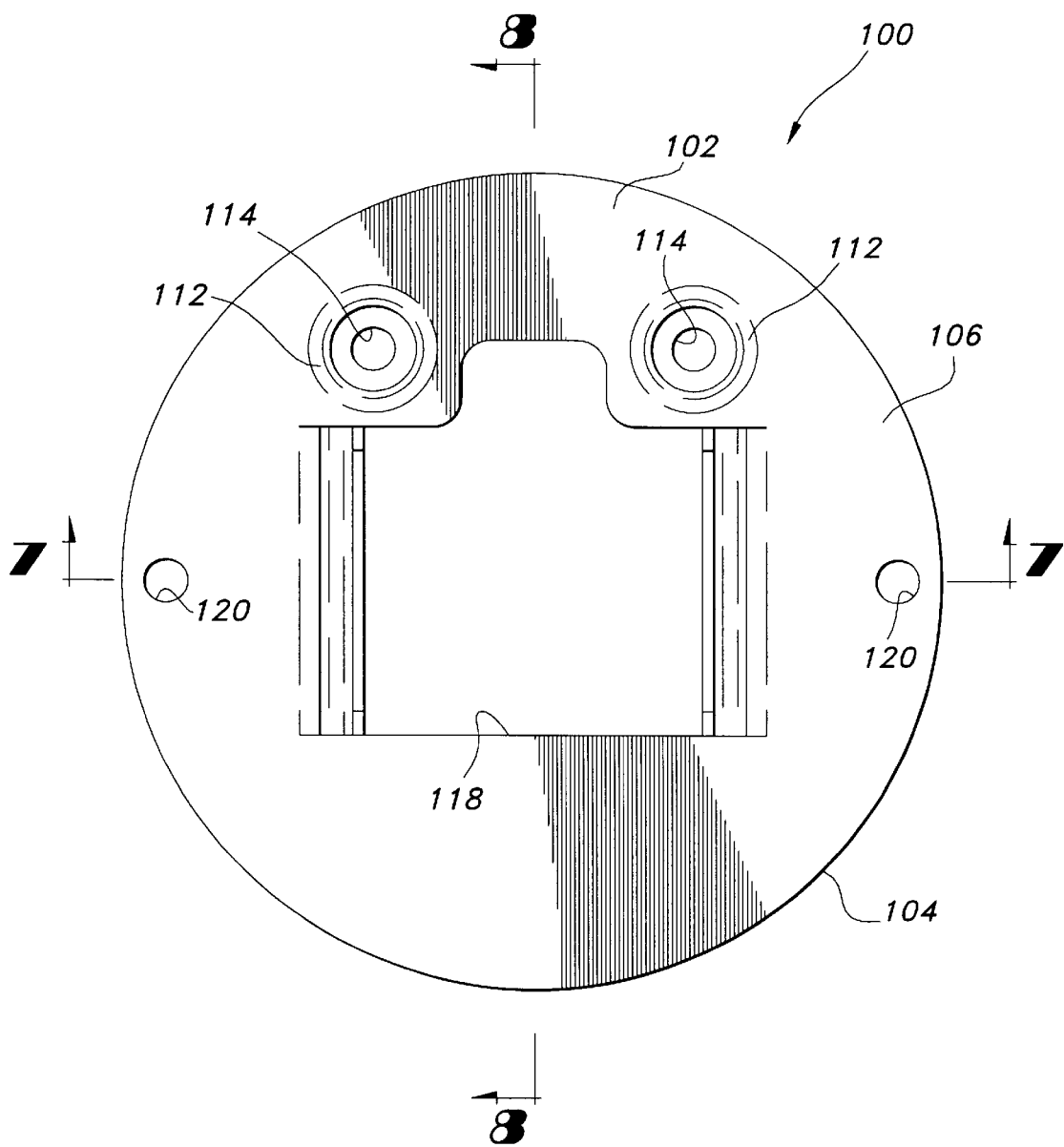
FIG. 6 is a plan view of an adapter plate included in the quick connect light fixture illustrated in FIGS. 1–5.

Referring now to FIGS. 6–8, the quick connect light fixture 14 further includes an adapter plate 100 preferably made of metal or a metal alloy. The adapter plate 100 includes a first portion 102 which, in the illustrative embodiment, comprises a disk portion having a substantially circular outer peripheral edge 104. However, in other embodiments, the adapter plate 100 may have other shapes, including but not limited to square and rectangular shapes, depending upon the structure to which adapter plate 100 is attached. The first portion 102 of adapter plate 100 includes first 106 and second 108 surfaces which are opposite one another. Surface 106 is preferably substantially flat to facilitate contacting engagement between adapter plate 100 and the surface of the structure to which adapter plate 100 is attached, as subsequently discussed. Although it is not necessary for surface 108 to be substantially flat, it may preferably be substantially flat for ease of manufacturing of adapter plate 100 which may preferably be made by a conventional stamping process.

Figure 9:
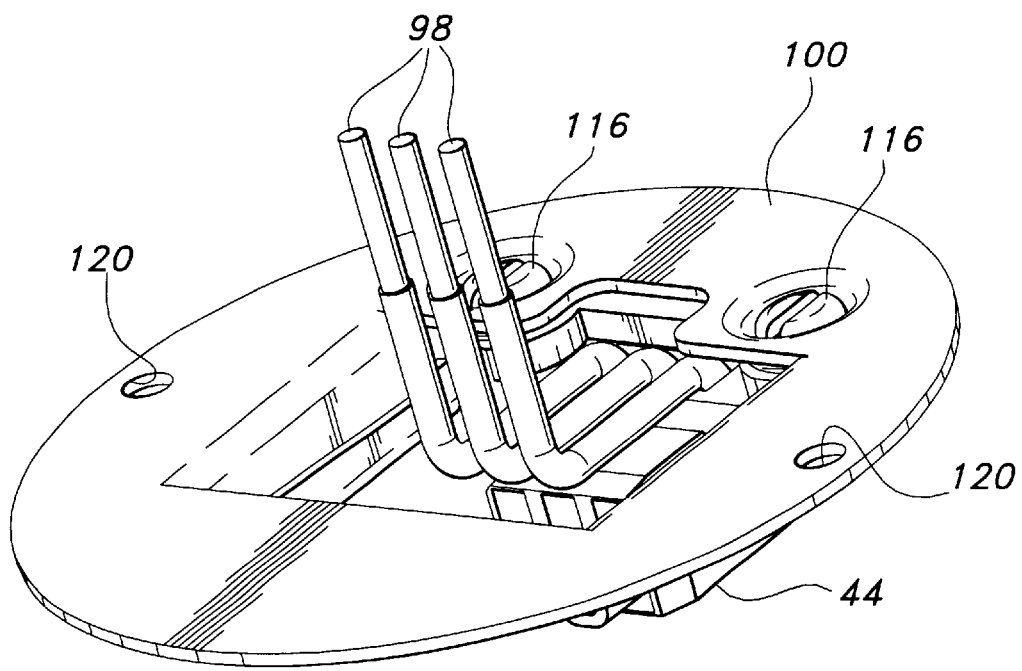
FIG. 9 is a perspective view of the adapter plate shown in FIGS. 6–8 with the female electrical connector shown in FIGS. 4 and 5 attached thereto.
Figure 10:
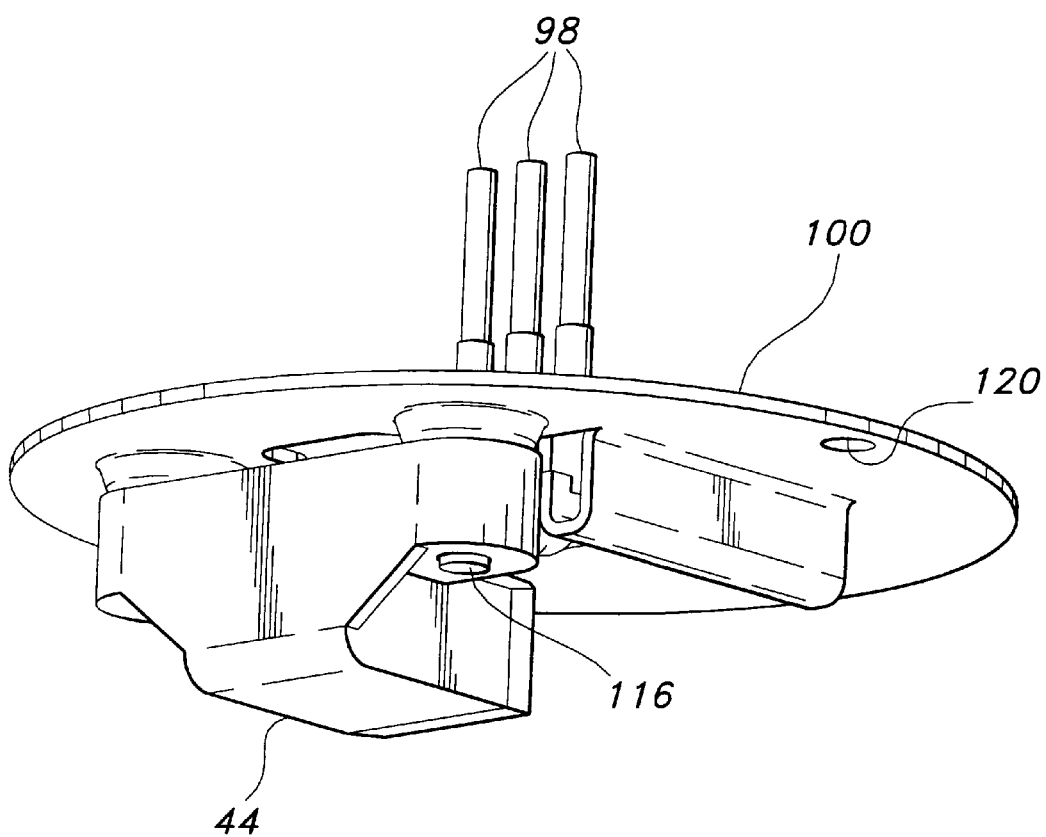
FIG. 10 is a perspective view of the sub-assembly shown in FIG. 9, taken from a different perspective.

Adapter plate 100 also includes a pair of embossments 110 which protrude from surface 108 of portion 102 of plate 100, and a pair of counterbores 112 which are formed in the surface 106 of portion 102 of plate 100 and are concentrically disposed relative to the embossments 110. Each embossment 110 defines a hole 114 extending through plate 100. Embossments 110, counterbores 112 and holes 114 are effective for receiving conventional threaded fasteners, such or screws or bolts 116 which are used to attach the female electrical connector 44 to adapter plate 100. FIGS. 9 and 10 each comprise perspective views, taken from different perspectives, illustrating the attachment of female electrical connector 44 to adapter plate 100. As shown in FIGS. 9 and 10, fasteners 116 pass through holes 114 and are threaded into the connector 44. Plate 100 further includes a generally centrally disposed aperture 118 which extends through plate 100 from surface 106 to and through surface 108, with aperture 118 being effective for permitting the electrical wires 98 of the female electrical connector 44 to pass through plate 100 to mating electrical wires in switch housing 40 which are electrically connected to the electrical wires in the structure to which the quick connect light fixture 14 is attached. Plate 100 further includes a pair of apertures 120, comprising substantially circular holes in the illustrative embodiment, extending through plate 100 from surface 106 to and through surface 108, for the purpose of receiving conventional threaded fasteners, such as bolts 122 shown in FIG. 3 which are used attach the adapter plate 100 to switch housing 40 in the illustrative embodiment. Fasteners 122 are preferably threaded into tapped holes (not shown) located within the switch housing 40.

Adapter plate 100 further includes a pair of flanges 124 which are spaced apart from one another and protrude from the first portion 102 of plate 100. Each of the flanges 124 has a generally J-shaped cross-section and defines a channel 126. Each of the flanges 124 includes a first sidewall 128 which is integral with the first portion 102 of adapter plate 100, at one end of sidewall 128, and extends from the portion 102. In the illustrative embodiment, when adapter plate 100 is attached to the switch housing 40 of ceiling fan 12, the sidewall 128 extends downwardly from the first portion 102 of adapter plate 100, due to the orientation of ceiling fan 12. However, in other embodiments, such as when the quick connect light fixture of the present invention comprises a wall sconce as subsequently discussed, sidewall 128 will not extend in a downwardly direction due to the orientation of the wall sconce. Each of the flanges 124 further includes a web portion 130 integral with the first sidewall 128 and extending transversely to the first sidewall 128, and a second sidewall 132 which is spaced apart from the first sidewall 128 and is integral with the web portion 130. The second sidewall 132 extends from the web portion 130 and, in the illustrative embodiment, when adapter plate 100 is attached to switch housing 40, the second sidewall 132 extends upwardly from the web portion 130. However, in other embodiments, such as when the quick connect light fixture of the present invention comprises a wall sconce, the second sidewall 132 will not extend in an upwardly direction due to the orientation of the wall sconce.

As best seen in FIG. 8, each of the flanges 124 includes a first end 134 and a second end 136. The second sidewall 132 of each flange 124 includes an upper edge 138 which is configured to define a shoulder 140 proximate the second end 136 of flange 124. The particular function of shoulder 140 will be discussed subsequently in greater detail. As shown in FIG. 8, the upper edge 138 is tapered between the first end 134 of flange 124 and the shoulder 140. More particularly, the upper edge 138 defines a taper 142 which preferably ranges from about three degrees to about ten degrees, relative to a plane which is substantially parallel to the substantially flat surface 106 of the first portion 102 of adapter plate 100. In the illustrative embodiment, when adapter plate 100 is attached to switch housing 40, the taper 142 comprises a downward taper between the first end 134 of flange 124 and the shoulder 140. However, in other embodiments, for instance when the quick connect light fixture of the present invention comprises a wall sconce, taper 142 will not comprise a downward taper due to the orientation of the wall sconce.

Figure 11:
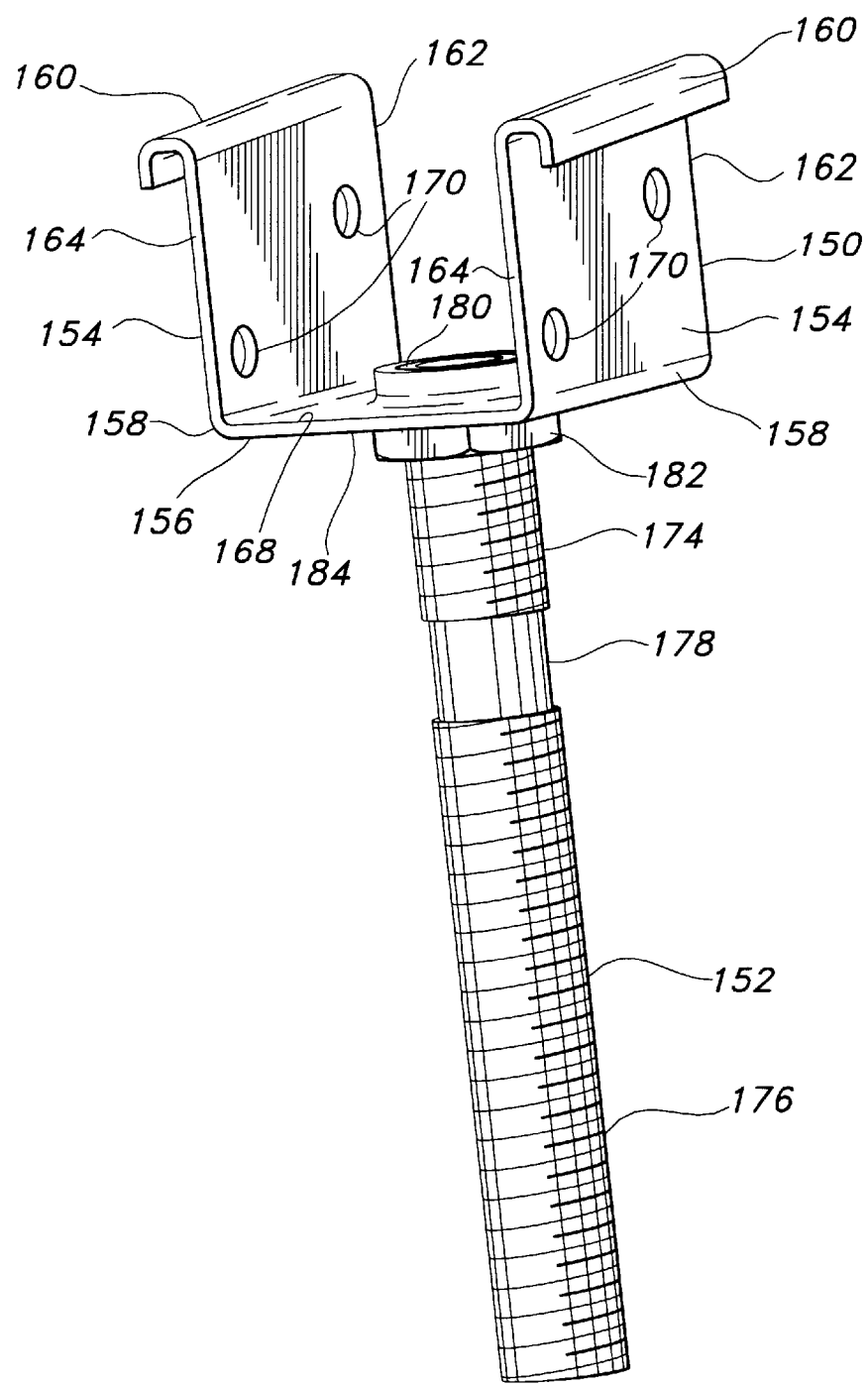
FIG. 11 is a perspective view illustrating an open-ended bracket and hollow rod which are included in the quick connect light fixture illustrated in FIGS. 1–10.
Figure 12:
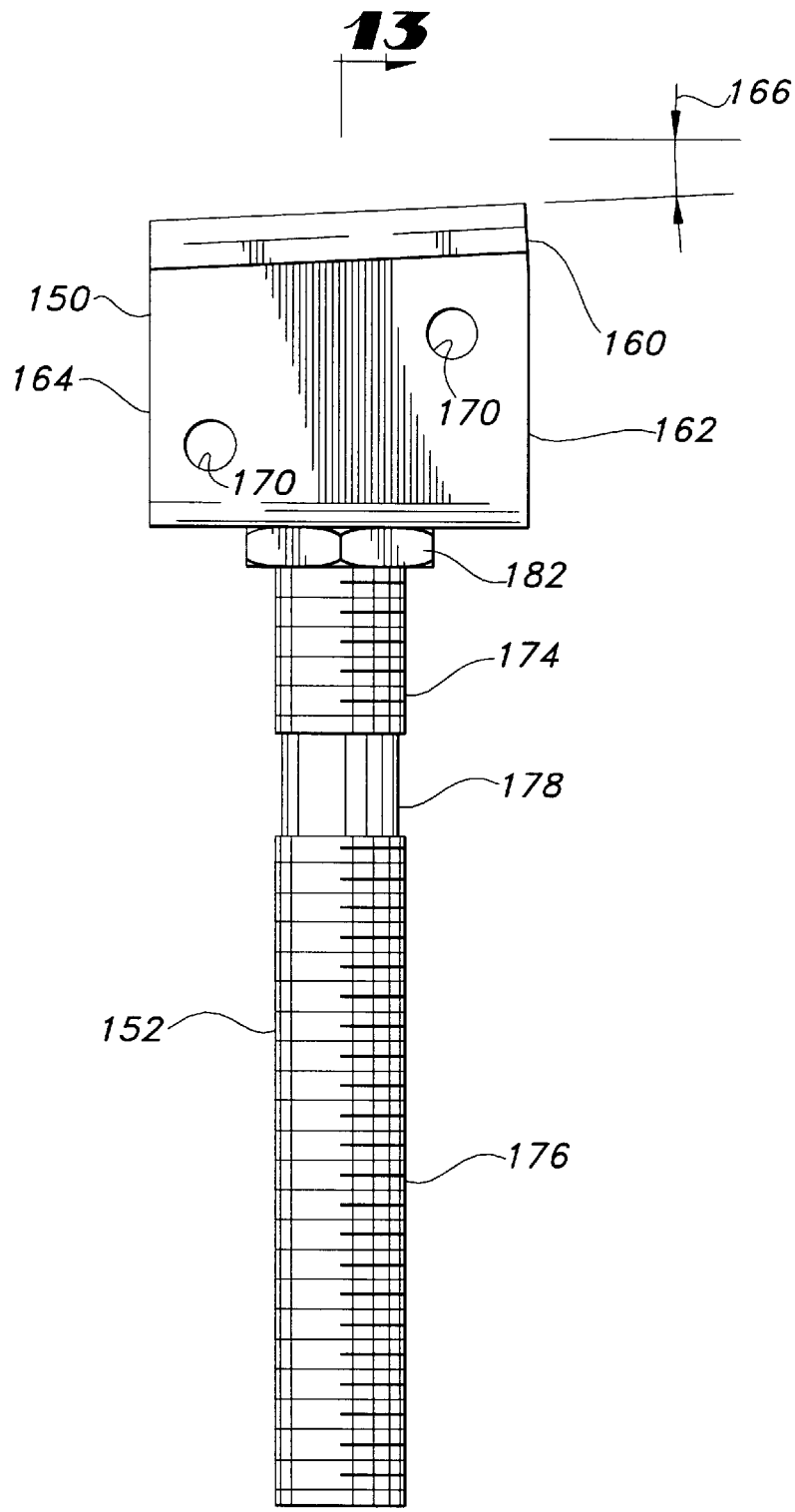
FIG. 12 is an elevational view of the bracket and rod shown in FIG. 11.
Figure 13:
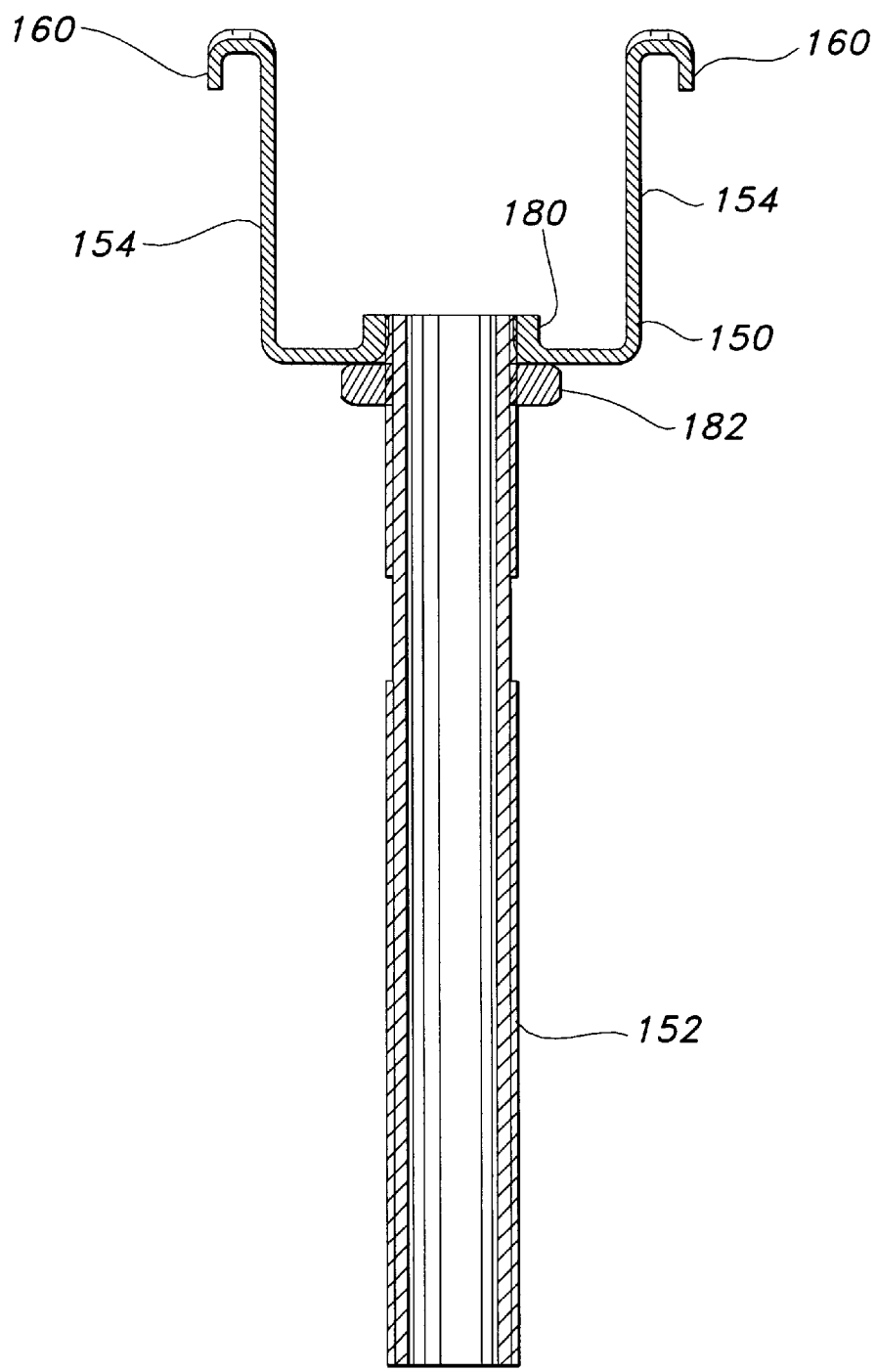
FIG. 13 is a cross-sectional view taken along line 13—13 in FIG. 12.
Figure 14:
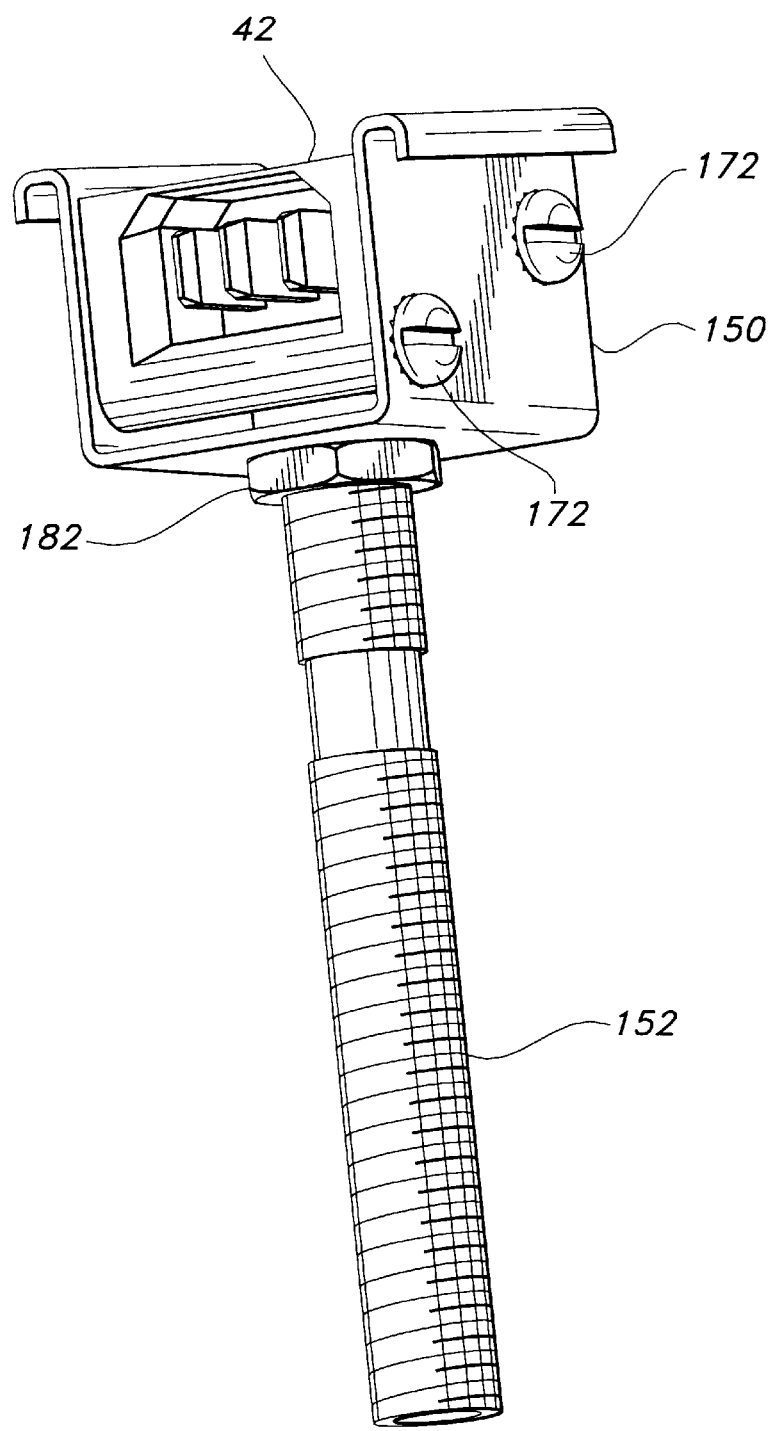
FIG. 14 is a perspective view illustrating the bracket and rod shown in FIGS. 11–13 with the male electrical connector shown in FIGS. 4 and 5 attached thereto.
Figure 15:
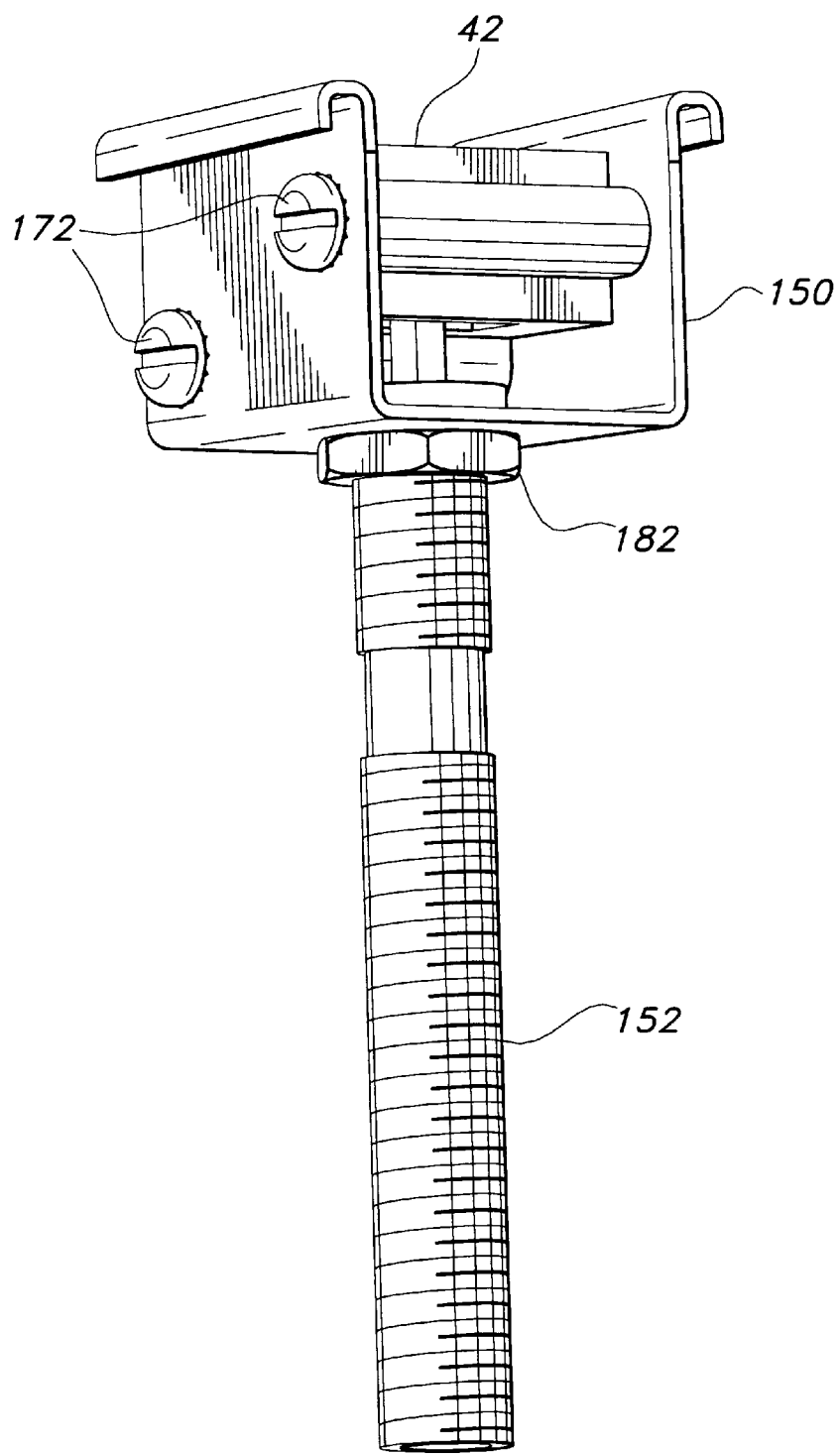
FIG. 15 is a perspective view of the sub-assembly shown in FIG. 14, taken from a different perspective.

Referring now to FIGS. 11–13, the quick connect light fixture 14 further includes an open-ended bracket 150 and a hollow rod 152 which is secured to bracket 150. Bracket 150 and rod 152 are both preferably made of metal or a metal alloy. The bracket 150 includes a pair of sidewalls 154 and a web 156 which separates the sidewalls 154. Each of the sidewalls 154 has a proximal portion 158 which is integral with the web 156 and a distal portion 160 which comprises a lip or flange. Each of the sidewalls 154 of bracket 150 includes first 162 and second 164 ends. As best seen in FIG. 12, each of the lips 160 is tapered between the first 162 and second 164 ends and defines a taper 166 which preferably ranges from about three degrees to about ten degrees, relative to an inner surface 168 of the web 156 of bracket 150. Accordingly, the taper 166 of lip 160 of bracket 150 substantially matches the taper 142 of the second sidewall 132 of each flange 124 of adapter plate 100, thereby facilitating the engagement of bracket 150 with adapter plate 100 as subsequently discussed in greater detail. As shown in FIGS. 11 and 12, each of the sidewalls 154 of bracket 150 includes a plurality of apertures 170, comprising a pair of substantially circular holes in the illustrative embodiment. Apertures 170 are effective for receiving conventional fasteners, such as screws 172 shown in FIGS. 14 and 15, to attach the male electrical connector 42 to the open-ended bracket 150.

The hollow rod 152 includes first 174 and second 176 threaded portions, which are separated by a non-threaded portion 178 of rod 152, which serves a subsequently described purpose. The rod 152 is secured to the open-ended bracket 150 by threading the first threaded portion 174 of rod 152 into a tapped, extruded portion 180 of bracket 150 which extends inwardly from the inner surface 168 of web 156 of bracket 150. The hollow rod 152 may be further secured to the open-ended bracket 150, by a conventional nut 182 which is threaded onto the first threaded portion 174 of rod 152 and disposed in abutting relationship with an outer surface 184 of the web 156 of bracket 150.

Figure 16:
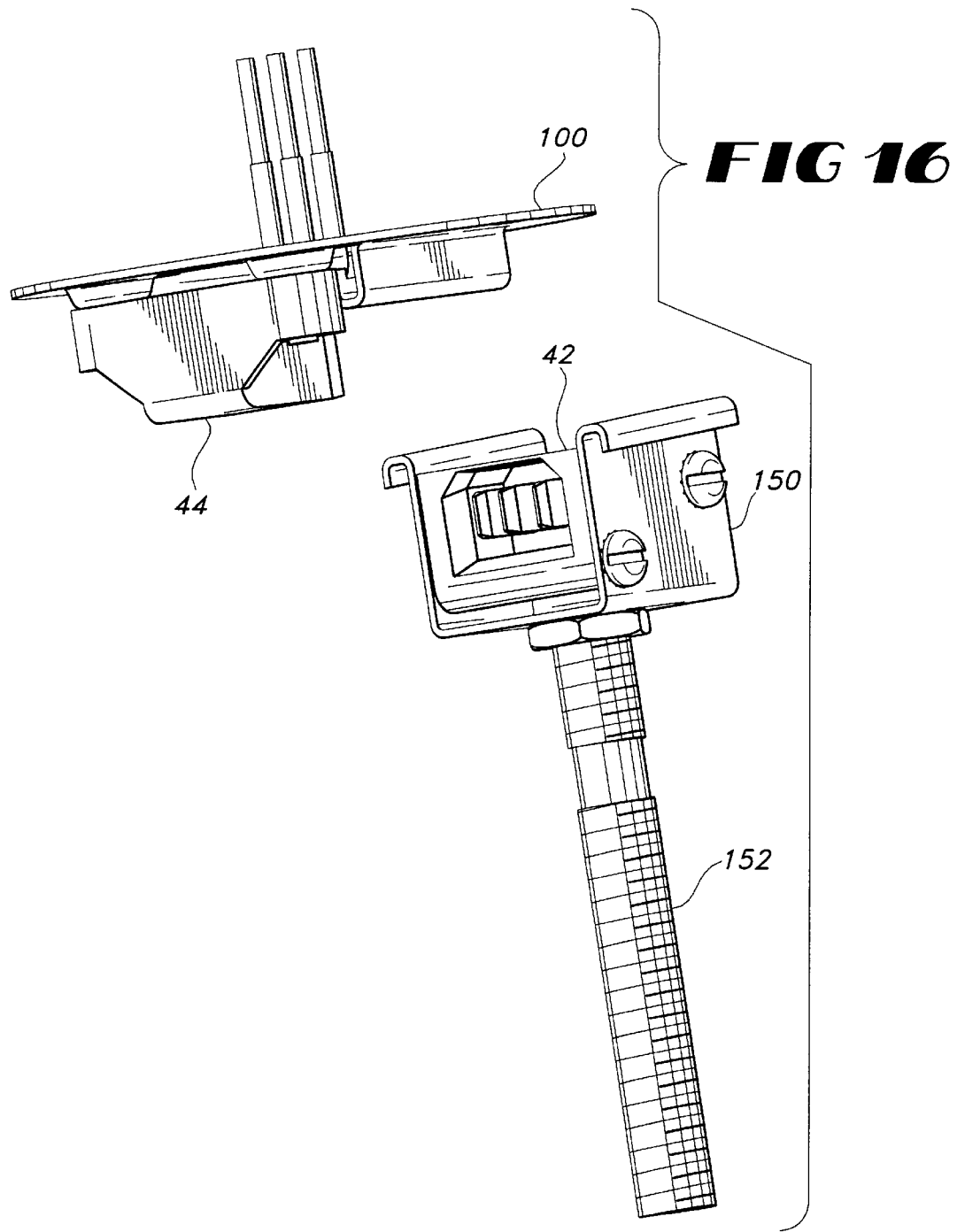
FIG. 16 is an exploded assembly, perspective view further illustrating the sub-assembly shown in FIGS. 9 and 10 and the sub-assembly shown in FIGS. 14 and 15.
Figure 17:
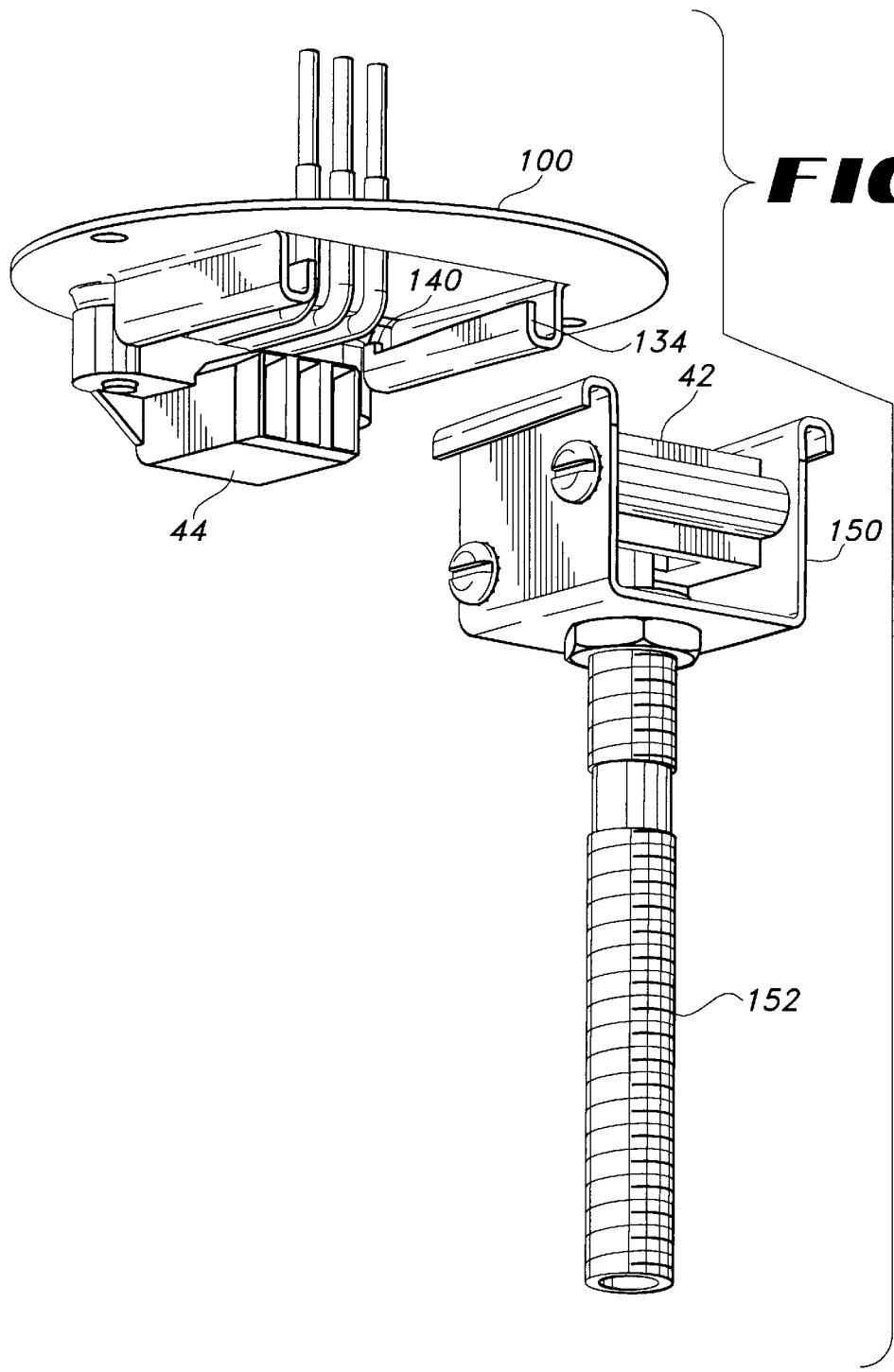
FIG. 17 is an exploded assembly, perspective view illustrating the same sub-assemblies shown in FIG. 16, but taken from a different perspective.

FIGS. 16 and 17 illustrate the sub-assembly comprising the adapter plate 100 and the female electrical connector 44, and the sub-assembly comprising the open-ended bracket 150, hollow rod 152 and the male electrical connector 42, from two different perspectives prior to the mating engagement of these sub-assemblies with one another.

Figure 18:
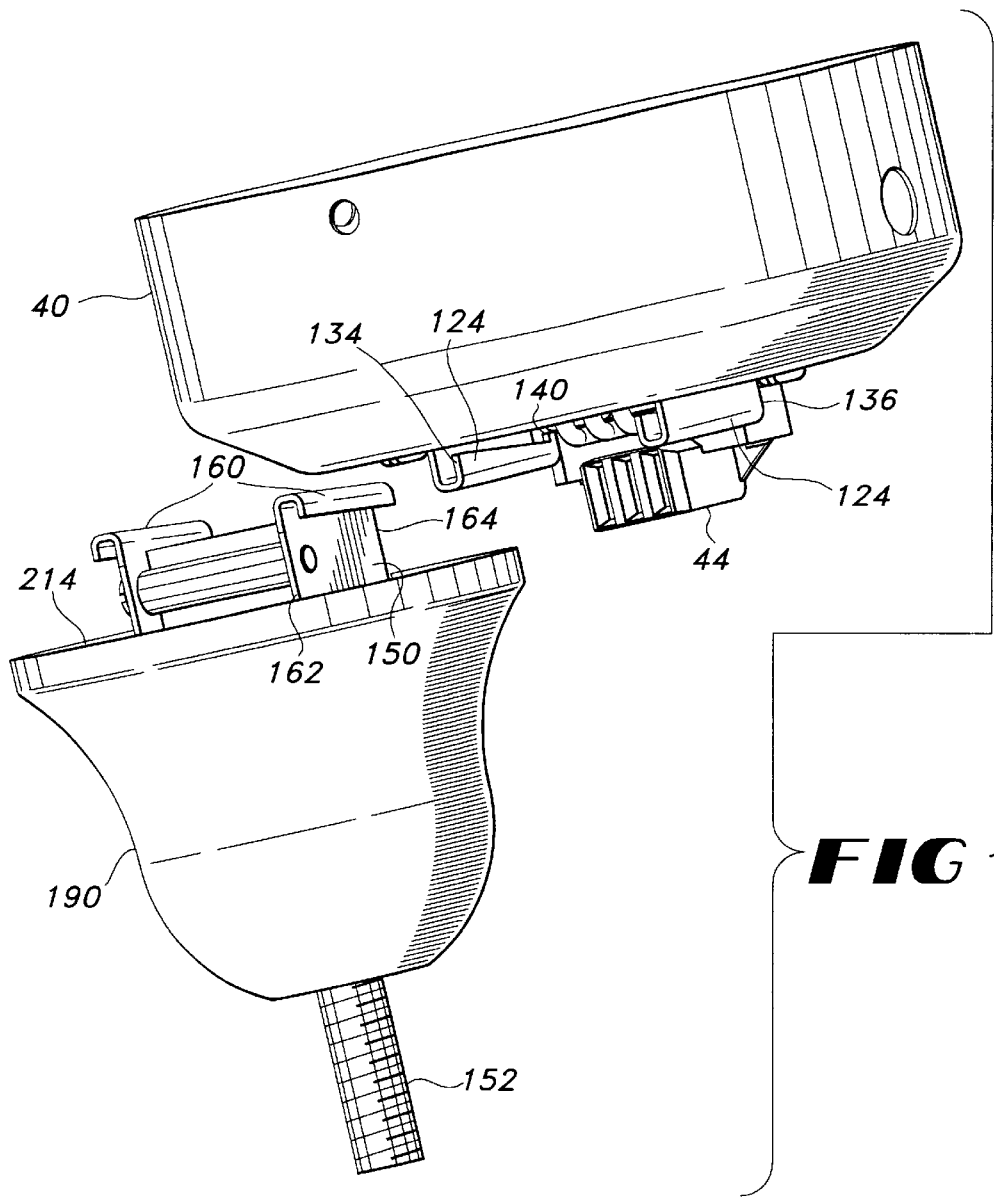
FIG. 18 is an exploded assembly, perspective view illustrating the adapter plate and female connector sub-assembly shown in FIGS. 9 and 10 attached to the switch housing of the ceiling fan shown in FIG. 1 and the bracket and rod sub-assembly shown in FIGS. 14 and 15, with a canopy disposed in surrounding relationship with the rod.
Figure 19:
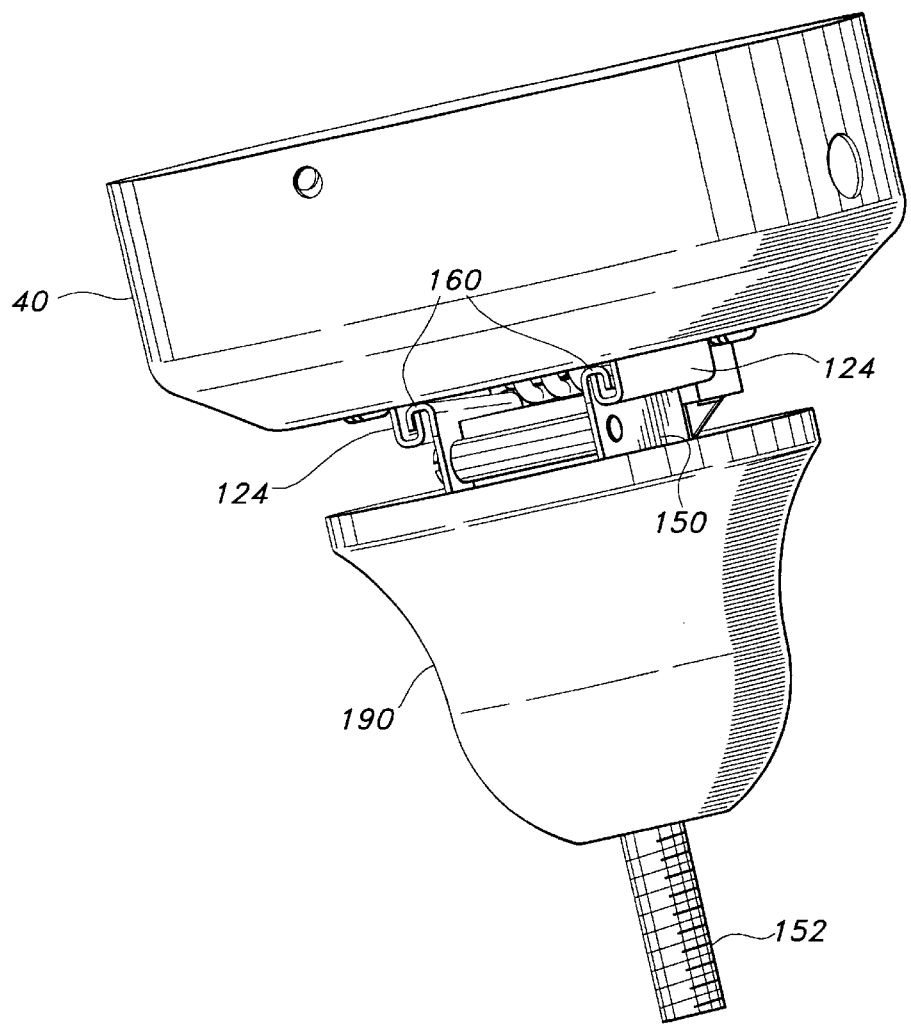
FIG. 19 is an exploded assembly, perspective view further illustrating the elements shown in FIG. 18, with the bracket and adapter plate engaged with one another and the canopy shown in a first, pre-installed position.
Figure 20:
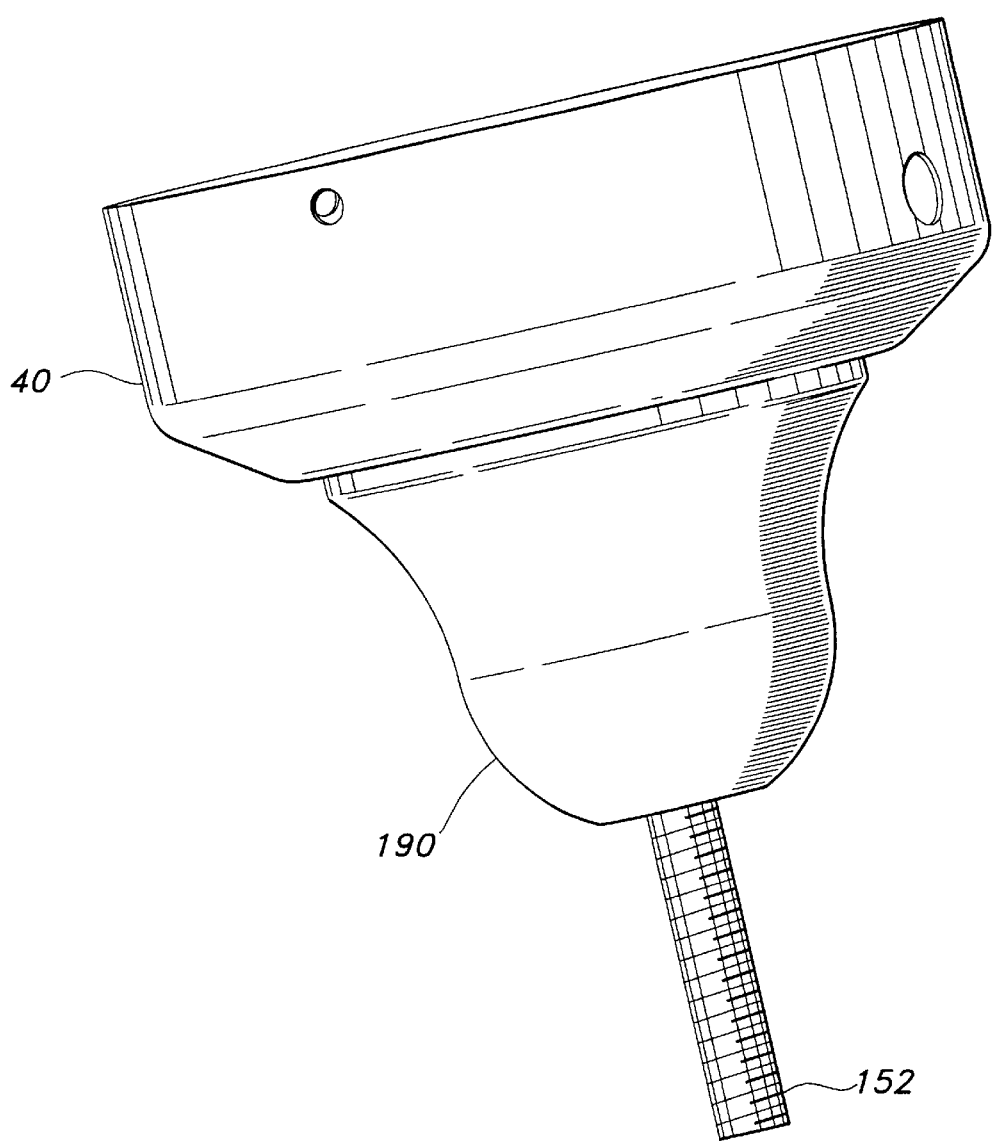
FIG. 20 is a perspective view similar to FIG. 19 but with the canopy in a second, installed position.

Referring now to FIGS. 18–22, the quick connect light fixture 14 further includes a locking member 190 disposed in surrounding relationship with and releasably secured to the hollow rod 152. In the illustrative embodiment, the locking member 190 comprises a canopy having a generally bell-shaped cross-section and is preferably made of metal or a metal alloy. However, in other embodiments, the canopy may have different shapes. The locking member or, canopy 190 serves a dual function in the illustrative embodiment. In the first instance, when the canopy 190 is in an installed position, as illustrated in FIGS. 20–22, the canopy 190 causes the adapter plate 100 and open-ended bracket 150, as well as the associated electrical connectors 44 and 42, respectively, to be securely locked to one another as subsequently discussed in further detail. Additionally, when the canopy 190 is in the installed position, the canopy 190 obscures the adapter plate 100 and open-ended bracket 150 from view, which facilitates providing an aesthetically pleasing appearance for the quick connect light fixture 14. The canopy 190 may include an ornamental design disposed about an outer surface of the canopy 190 which further aids in the provision of an aesthetically pleasing appearance for light fixture 14.

The canopy 190 includes a shell portion 192 which defines an interior cavity 194 and further includes a receptacle portion 196 which is integral with the shell portion 192 and disposed within the interior cavity 194. The receptacle portion 196 has a substantially cylindrical cross-section and is configured to permit the hollow rod 152 to extend therethrough. The receptacle portion 196 is open at one end, is generally hollow, and includes an aperture formed in an opposite end which is defined by a threaded portion 198 of receptacle portion 196. The threaded portion 198 is threaded onto the hollow rod 152 and, as shown in FIGS. 21 and 22, is threadedly engaged with the first threaded portion 174 of the hollow rod 152 when the canopy 190 is disposed in an installed position. In this position, an upper edge 214 of canopy 190 is disposed in contacting engagement with a substantially flat lower surface 41 of the switch housing 40. It is further noted that the surface 106, comprising an upper surface in the illustrative embodiment, of the first portion 102 of adapter plate 100 is also disposed in contacting engagement with the substantially flat lower surface 41 of the switch housing 40.

The quick connect light fixture 14 further includes a distributor 200 which is supported by the hollow rod 152. The second threaded portion 176 of rod 152 is threaded into the distributor 200. As shown in FIGS. 21 and 22, each of the wires 74 which are electrically coupled to the male electrical connector 42 extend downward from the connector 42 through the interior of the hollow rod 152 to the distributor 200. Light fixture 14 further includes a plurality of light fitters 201 and a plurality of light globes 202 shown in FIGS. 1–3, with each of the light globes 202 being secured to one of the light fitters 201, preferably by mating threads in fitters 201 and light globes 202. Additionally, light fixture 14 includes a plurality of hollow mount arms 204, equal in number to light fitters 201 and light globes 202. Each of the hollow mount arms 204 has a first portion 206 connected to and supported by the distributor 200, and a second portion 208 connected to and supporting one of the light fitters 201.

Distributor 200, light fitters 201 and mount arms 204 are preferably made of metal or a metal alloy whereas light globes 202 are preferably made of glass or plastic. It should be understood, although not illustrated, that light fixture 14 includes a plurality of conventional light sockets and light bulbs, with one of the light sockets and light bulbs being disposed within each of the light globes 202. The wires 74 terminate in a hollow interior of the distributor 200, with appropriate splices being made as required, so that the required electrical wires may be routed from the distributor 200 outward through the hollow mount arms 204 to the light sockets disposed within the light globes 202, thereby providing electrical power to the included light bulbs.

The quick connect light fixture 14 may optionally include a hollow sleeve 210 which is disposed in surrounding relationship with the hollow rod 152 and extends between the canopy 190 and the distributor 200. The purpose of the hollow sleeve 210 is to obscure the hollow rod 152, and the included external threads, from view to further add to the aesthetically pleasing appearance of the light fixture 14. In this regard, the hollow sleeve 210 may include an ornamental design on the exterior surface of sleeve 210. As shown in FIGS. 21 and 22, an upper portion of the hollow sleeve 210 protrudes into the receptacle 196 of canopy 190 when the canopy 190 is disposed in an installed position. The receptacle 196 of canopy 190 is sized, with respect to the height of receptacle 196 which extends along the length of rod 152, so that sleeve 210 may be disposed within receptacle 196 without contacting an upper inner surface 212 of receptacle 196, when the canopy 190 is disposed in a pre-installed position which is illustrated in FIGS. 18 and 19. When the canopy 190 is disposed in the pre-installed position, the threaded portion 198 of receptacle 196 of canopy 190 is disposed in surrounding relationship with the non-threaded portion 178 of the hollow rod 152, thereby creating a loose fit of canopy 190 about rod 152 in this position. Furthermore, when the canopy is in a pre-installed position, the relative position between the edge 214 of the shell portion 192 of canopy 190 and bracket 150 is such that the male electrical connector 42 may be disengaged from the female electrical connector 44.

As may be appreciated by reference to FIGS. 18 and 19, the taper 142 of the upper edge 138 of sidewall 132 of each of the flanges 124 of adapter plate 100, in combination with the substantially matching taper 166 of each of the lips 160 of the open-ended bracket 150, facilitates the mating engagement of bracket 150 with adapter plate 100 and the mating engagement of the male electrical connector 42 with the female electrical connector 44 due to the action of gravity. When the adapter plate 100 is attached to switch housing 40, as shown in FIGS. 18 and 19, the taper 142 extends downwardly from a first end 134 of the corresponding flange 124 of adapter plate 100, toward the shoulder 140 formed in the corresponding flange 124. End 134 may be considered a forward end when adapter plate 100 is fastened to switch housing 40. The lips 160 of the sidewalls 154 of the open-ended bracket 150 are similarly tapered, i.e., in a downward direction, between ends 162 and 164 of sidewalls 154 of bracket 150. As stated previously, the taper 166 substantially matches that of the taper 142. As lips 160 are initially engaged with flanges 124, the action of gravity assists in the sliding engagement of lips 160 of bracket 150 with flanges 124 of adapter plate 100 until lips 160 contact the corresponding shoulder 140 of flanges 124. When this occurs, the male electrical connector 42 is engaged with the female electrical connector 44.

When canopy 190 is threaded onto the hollow rod 152, such that the edge 214 of the shell portion 192 of canopy 190 is in contacting engagement with switch housing 40, the canopy 190 exerts a force acting on the lips 160 of the open-ended bracket 150 and flanges 124 of adapter plate 100, thereby securely locking bracket 150 to adapter plate 100 so that the bracket 150 may not move relative to adapter plate 100. Accordingly, the male electrical connector 42 is securely engaged with the female electrical connector 44. The force exerted by the canopy 190 on lips 160 and flanges 124 acts in a direction which is substantially parallel to a centerline (not shown) of the hollow rod 152.

Figure 23:
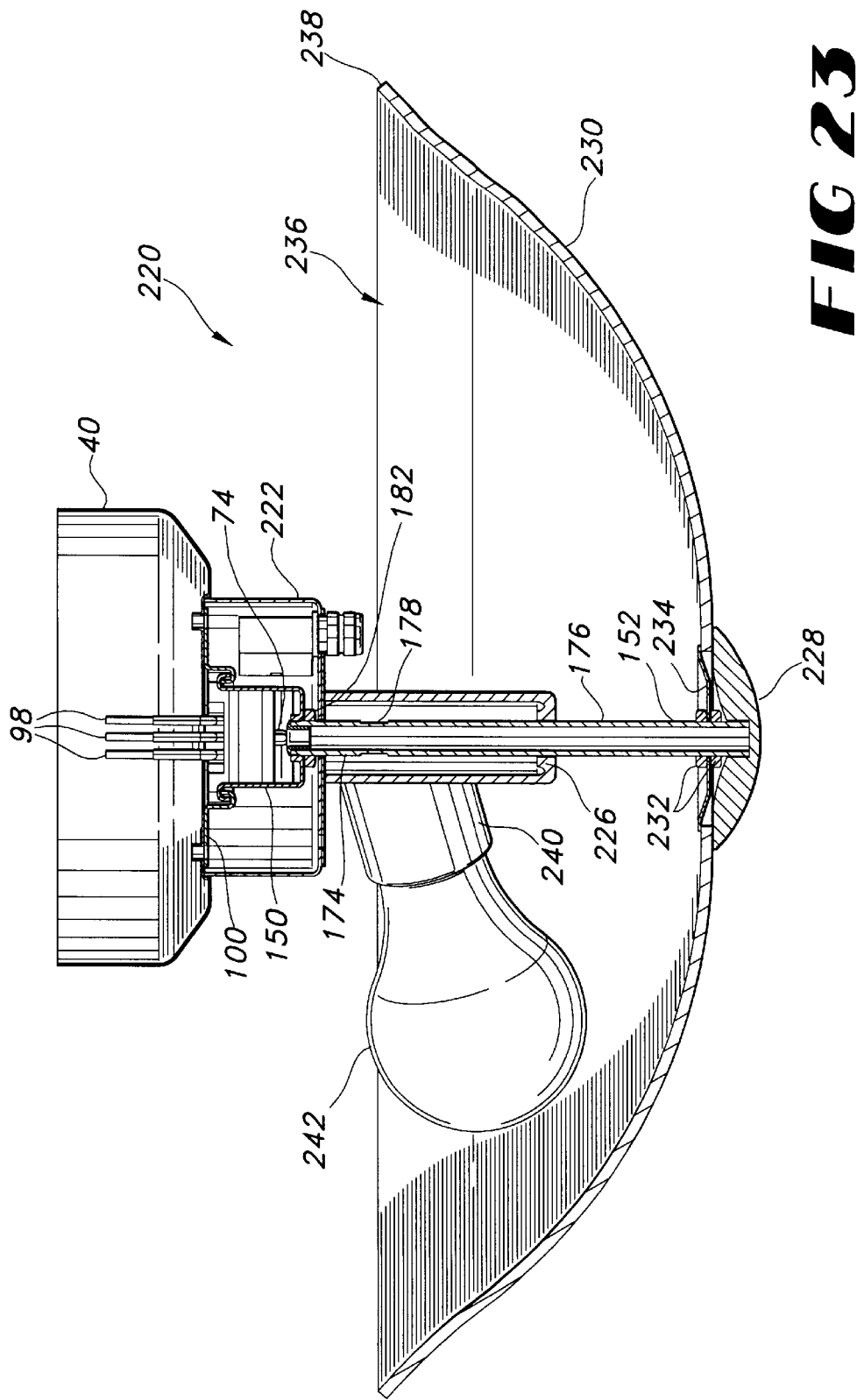
FIG. 23 is an elevational view, partially in cross-section, illustrating a quick connect light fixture according to a second embodiment of the present invention.

FIG. 23 illustrates a quick connect light fixture 220 according to a second embodiment of the present invention. In this embodiment, the light fixture 220 comprises a single, upwardly open globe type light fixture due to the configuration and relative positioning of the included light globe. The quick connect light fixture 220 includes the following components which are common with the quick connect light fixture 14 and therefore includes the features of these components described previously: adapter plate 100 and female electrical connector 44 attached thereto; open-ended bracket 150 and male electrical connector 42 attached thereto; hollow rod 152; and the associated fasteners. Additionally, the foregoing components are connected to one another as described previously with respect to light fixture 14 and adapter plate 100 is attached to switch housing 40 as discussed previously. However, light fixture 220 differs from light fixture 14 in the following regards. Light fixture 220 includes a housing or canopy 222 and a separate locking member 224 which replace the dual function canopy 190 of light fixture 14. The locking member 224 comprises a hollow sleeve disposed in surrounding relationship with the hollow rod 152 and, as shown in FIG. 23, the canopy 222 is disposed between switch housing 40 and locking member 224. As discussed previously, hollow rod 152 includes first 174 and second 176 threaded portions, having external threads and a non-threaded portion 178 disposed between threaded portions 174 and 176. Alternatively, rod 152 may be replaced by a hollow threaded rod or threaded nipple having external threads disposed about the entire length of the rod, with no non-threaded portion. The locking member or hollow sleeve 224 includes a threaded portion 226 which is threaded onto hollow rod 152 until the canopy 222 is forced into contacting engagement with the switch housing 40 as shown in FIG. 23, thereby causing a force to be exerted on the lips 160 of bracket 150 and the flanges 124 of adapter plate 100 which locks these elements to one another as discussed previously. Furthermore, when the locking member 224 and canopy 222 are in an installed position as shown in FIG. 23, the canopy 222 obscures the open-ended bracket 150 and adapter plate 100 from view.

Another difference in light fixtures 220 and 14 is that the distributor 200, light fitters 201, light globes 202 and the associated mount arms 204 of light fixture 14 are not included in light fixture 220. Instead, the second threaded portion 176 of the hollow rod 152 is threaded into a globe-supporting structure 228. The quick connect light fixture 220 further includes a light globe 230 having an upwardly facing, generally dish-shaped cross-section, which is secured in position as follows. An annular clip 234, having a central aperture which receives hollow rod 152, is disposed between and locked in position by a pair of nuts 232 threaded onto the second threaded portion 176 of hollow rod 152. The globe-supporting structure 228 includes internal threads (not shown) and is threaded onto the second threaded portion 176 of hollow rod 152 until the globe-supporting structure 228 is in contacting engagement with globe 230 and globe 230 is also in contacting engagement with clip 234, thereby securing globe 230 in position. The globe 230 has an open top and an upper edge 238 which is disposed radially outwardly of the switch housing 40 so as to obscure the switch housing 40 from view by an observer positioned below the ceiling fan. A light socket 240 is connected to the canopy 222 via bracket means (not shown) and a conventional light bulb 242 is disposed within the socket 240. The electrical wires 74 are routed out through one of the open ends of bracket 150 and are electrically coupled to the light socket 240.

Figure 24:
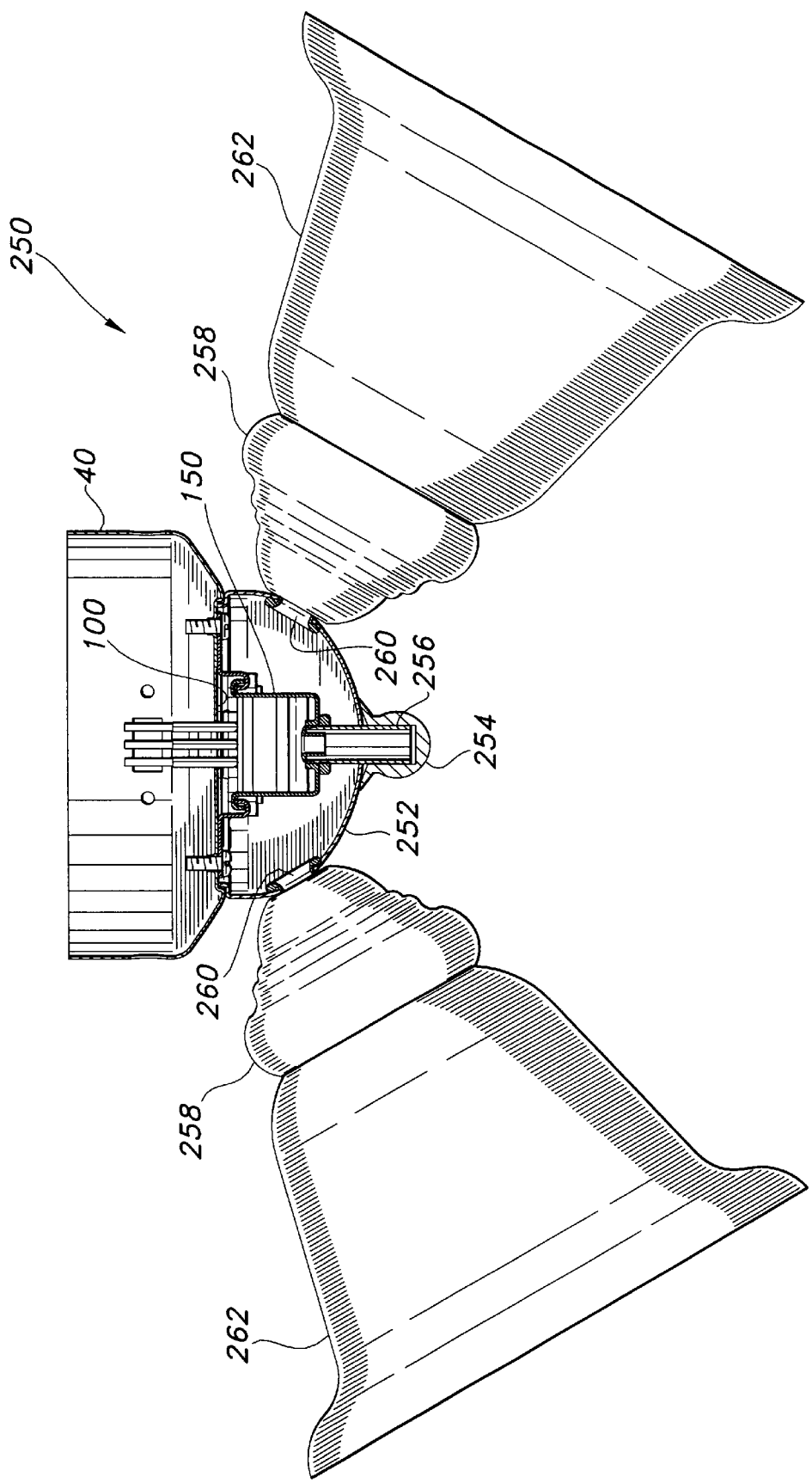
FIG. 24 is an elevational view, partially in cross-section, illustrating a quick connect light fixture according to a third embodiment of the present invention.

FIG. 24 illustrates a quick connect light fixture 250 according to a third embodiment of the present invention. Similar to the previously discussed embodiment, the quick connect light fixture 250 includes the following components which are common with the quick connect light fixture 14 and therefore includes the features of these components described previously: adapter plate 100 and female electrical connector 44 attached thereto; open-ended bracket 150 and male electrical connector 42 attached thereto; and the associated fasteners. Additionally, the foregoing components are connected to one another as described previously with respect to light fixture 14 and adapter plate 100 is attached to switch housing 40 as discussed previously. However, light fixture 250 differs from light fixture 14 in the following regards. Light fixture 250 includes a housing or canopy 252 and a separate locking member 254 which replace the dual function canopy 190 of light fixture 14. Furthermore, the hollow rod 152 of light fixture 14 is replaced by a hollow rod or threaded nipple 256 having external threads disposed along the entire length of the rod 256. The hollow rod 256 is threadedly secured, at one end thereof to the open-ended bracket 150 and is threadedly secured, at the other end thereof, to the locking member 254. The locking member 254 comprises a finial and, as shown in FIG. 24, the canopy 252 is disposed between switch housing 40 and locking member 254. The locking member 254 includes internal threads (not shown) and is threaded onto the rod 256 until the canopy 252 is forced into contacting engagement with the switch housing 40 as shown in FIG. 24, thereby causing a force to be exerted on the lips 160 of bracket 150 and the flanges 124 of adapter plate 100 which locks these elements to one another as discussed previously. Furthermore, when the locking member 254 and canopy 252 are in an installed position as shown in FIG. 24, the canopy 252 obscures the open-ended bracket 150 and adapter plate 100 from view.

Another difference between light fixture 250 and light fixture 14 is that the distributor 200, light fitters 201, light globes 202 and associated hollow mount arms 204 are omitted from light fixture 250. Instead, light fixture 250 includes a plurality of light fitters 258 secured to and extending outwardly from the canopy 252. Both the canopy 252 and the light fitters 258 are preferably made of metal and light fitters 258 are preferably staked or swaged to canopy 252. This is achieved by passing an end portion 260 of the light fitters 258 through openings in canopy 252 and then staking or swaging the end portions 260 to an inner surface of canopy 252. The quick connect light fixture 250 further includes a plurality of light globes 262, with each of the light globes 262 being secured to one of the light fitters 258. This may be accomplished by including mating threads on globes 262 and light fitters 258, or by other suitable means, such as the use of thumb screws extending through fitters 258 into contacting engagement with the corresponding globe 262. A light socket (not shown) is supported by and disposed within each of the light fitters 258 and a conventional light bulb (not shown) is disposed within each socket, with the light bulb being surrounded by a corresponding light globe 262. The electrical wires 74 are routed out through one of the open ends of bracket 150 and are spliced as required, and then connected to each of the light sockets disposed within the light fitters 258.

Figure 25:
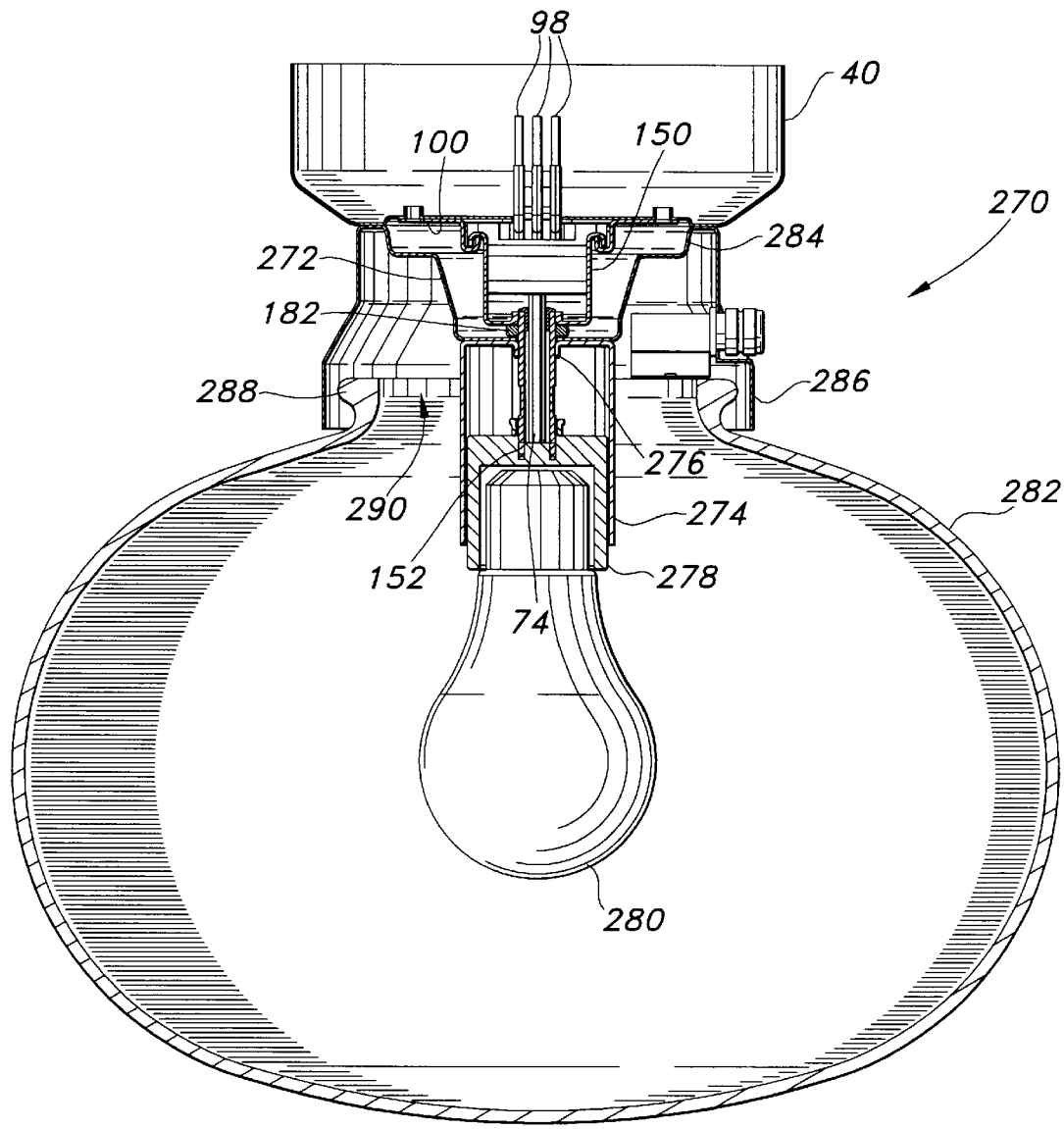
FIG. 25 is an elevational view, partially in cross-section, illustrating a quick connect light fixture according to a fourth embodiment of the present invention.

FIG. 25 illustrates a quick connect light fixture 270 according to a fourth embodiment of the present invention. In this embodiment, the light fixture 270 comprises a "closed globe" type light fixture due to the configuration and positioning of the subsequently discussed, included light globe. Similar to the second embodiment of the present invention, the quick connect light fixture 270 includes the following components which are common with the quick connect light fixture 14 and therefore include the features of these components which were described previously: adapter plate 100 and female electrical connector 44 attached thereto; open-ended bracket 150 and male electrical connector 42 attached thereto; hollow rod 152; and the associated fasteners. Additionally, the foregoing components are connected to one another as described previously with respect to light fixture 14 and adapter plate 100 is attached to switch housing 40 of ceiling fan 12 as discussed previously.

However, light fixture 270 differs from light fixture 14 in the following regards. Light fixture 270 includes a housing or canopy 272 and a separate locking member 274 which replace the dual function canopy 190 of light fixture 14. The locking member 274 comprises a hollow sleeve disposed in surrounding relationship with the hollow rod 152 and, as shown in FIG. 25, the canopy 272 is disposed between switch housing 40 and locking member 274. As discussed previously, hollow rod 152 includes first 174 and second 176 threaded portions having external threads and a non-threaded portion 178 disposed between threaded portions 174 and 176. Alternatively, rod 152 may be replaced by a hollow threaded rod or threaded nipple having external threads disposed about the entire length of the rod or nipple, with no non-threaded portion. The locking member or hollow sleeve 274 includes a threaded portion 276, disposed at an upper end of locking member 274, which is threaded onto the first threaded portion 174 of the hollow rod 152 until the canopy 272 is forced into contacting engagement with the switch housing 40 as shown in FIG. 25, thereby causing a force to be exerted on the lips 160 of bracket 150 and the flanges 124 of adapter plate 100 which locks these elements to one another as discussed previously. Furthermore, when the locking member 274 and canopy 272 are disposed in an installed position as shown in FIG. 25, the canopy 272 obscures the open-ended bracket 150 and adapter plate 100 from view.

Another difference between the quick connect light fixture 270 and the quick connect light fixture 14, is that the distributor 200, light fitters 201, light globes 202 and the associated hollow mount arms 204 of light fixture 14 are not included in light fixture 270, but instead, the second threaded portion 176 of the hollow rod 152 is threaded into a conventional light socket 278 which receives a conventional light bulb 280. Furthermore, the quick connect light fixture 270 includes a globe 282 which is disposed in surrounding relationship with the light bulb 280 and is secured to the canopy 272. The canopy 272 includes a first, upwardly facing shell portion 284 and a second, downwardly facing shell portion 286 which are integral with one another. When the canopy 272 is installed, the first shell portion 284 obscures bracket 150 and plate 100 from view. As shown in FIG. 25, the globe 282 is secured to the second shell portion 286 of canopy 272. This may be accomplished by including mating threads on an upper lip portion 288 of globe 282 and on the second shell portion 286 of canopy 272, or by other suitable means, such as the use of thumb screws extending through the second shell portion 286 of canopy 272 into contacting engagement with the lip portion 288 of globe 282. However, it should be understood that the particular manner in which globe 282 is secured to canopy 272 does not form a part of the present invention.

Although globe 282 includes an open top 290, it is considered a "closed globe" type due to the spatial relationship between globe 282 and canopy 272, and since globe 282 completely encompasses socket 278 and globe 280. The electrical wires 74 are routed downward through the hollow rod 152 to the light socket 278, thereby providing electrical power to socket 278 and bulb 280.

Figure 26:
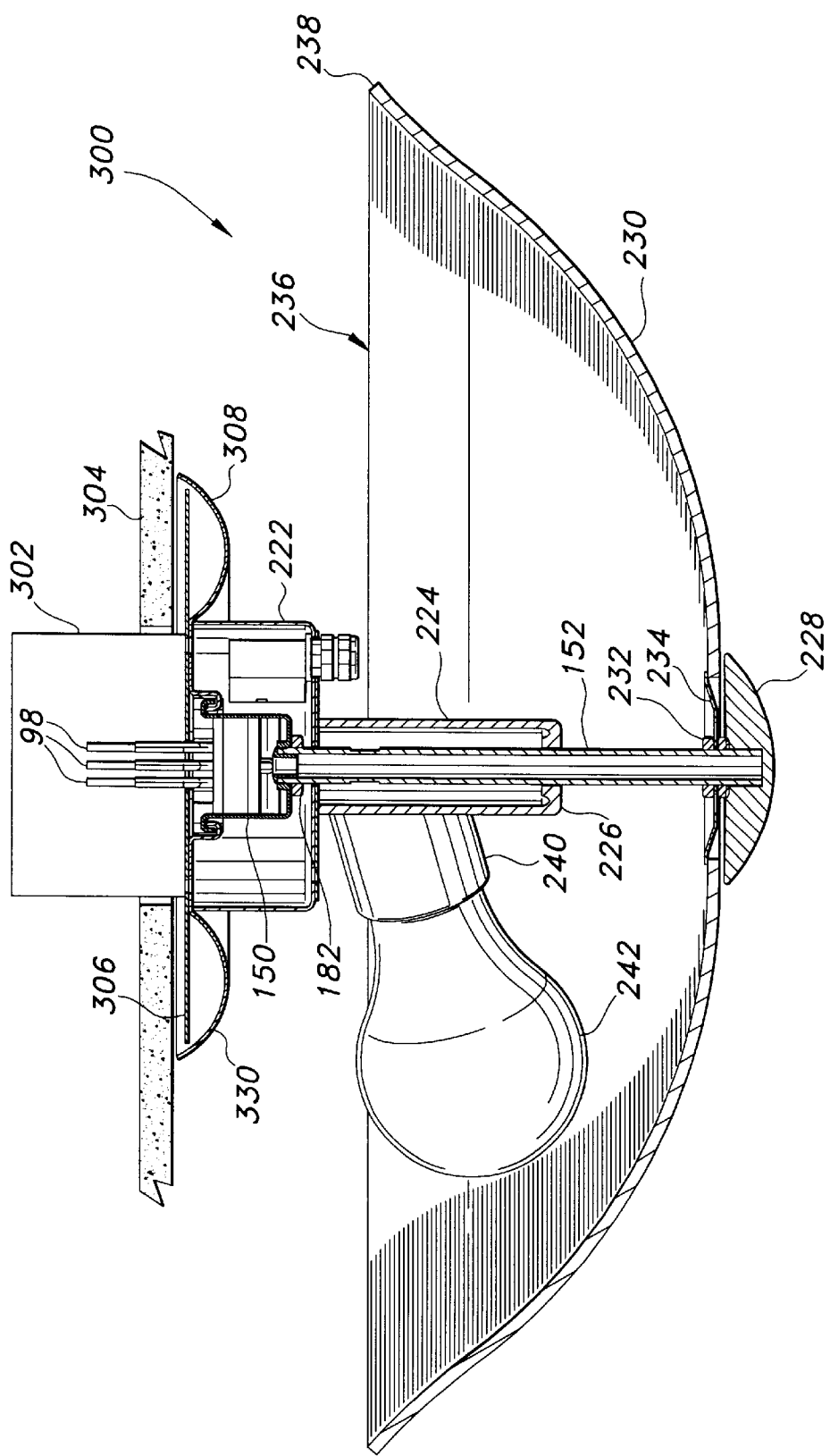
FIG. 26 is an elevational view, partially in cross-section, illustrating a quick connect light fixture according to a fifth embodiment of the present invention.
Figure 27:
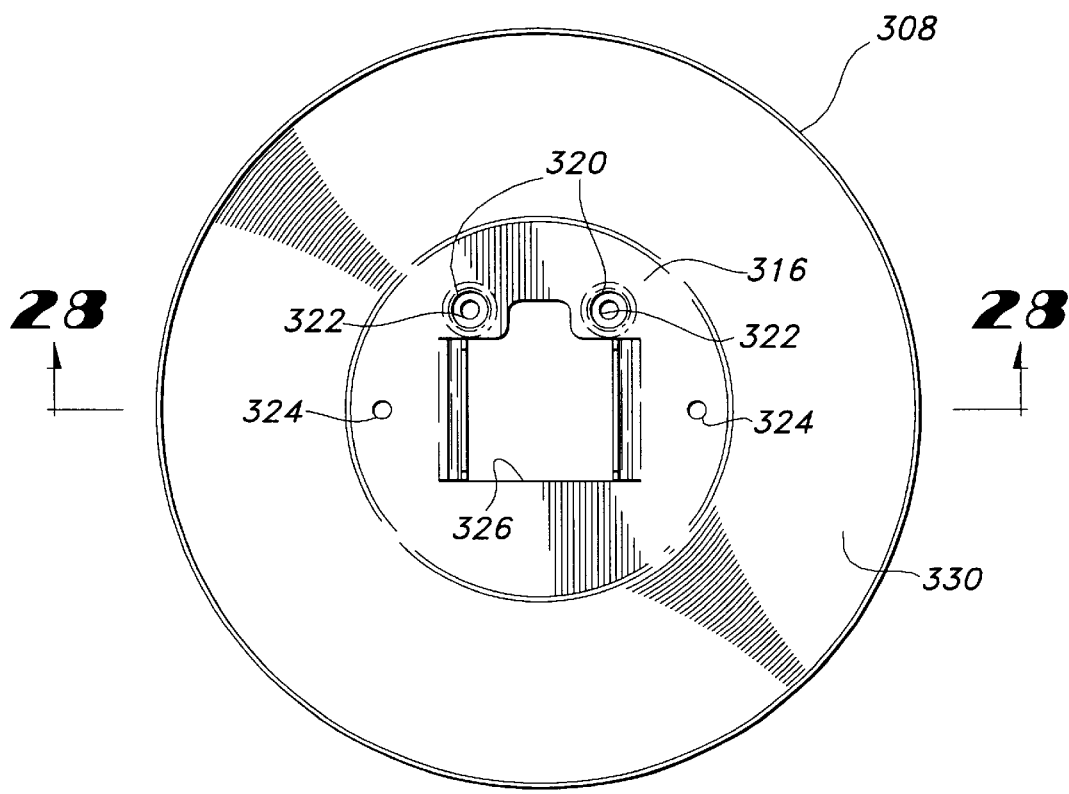
FIG. 27 is a top plan view of an adapter plate included in the quick connect light fixture illustrated in FIG. 26.
Figure 28:
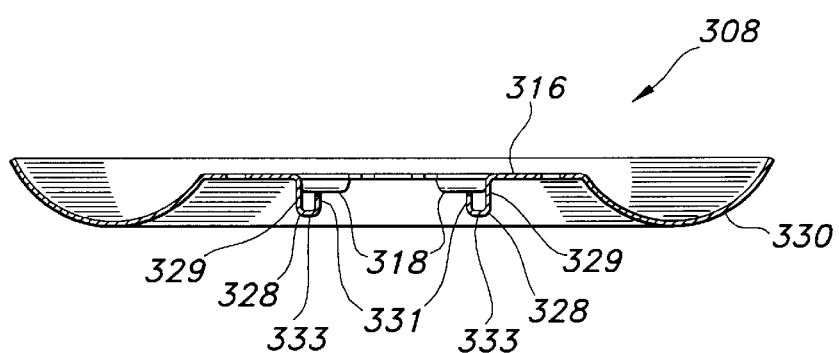
FIG. 28 is a cross-sectional view taken along line 28—28 in FIG. 27.
Figure 29:
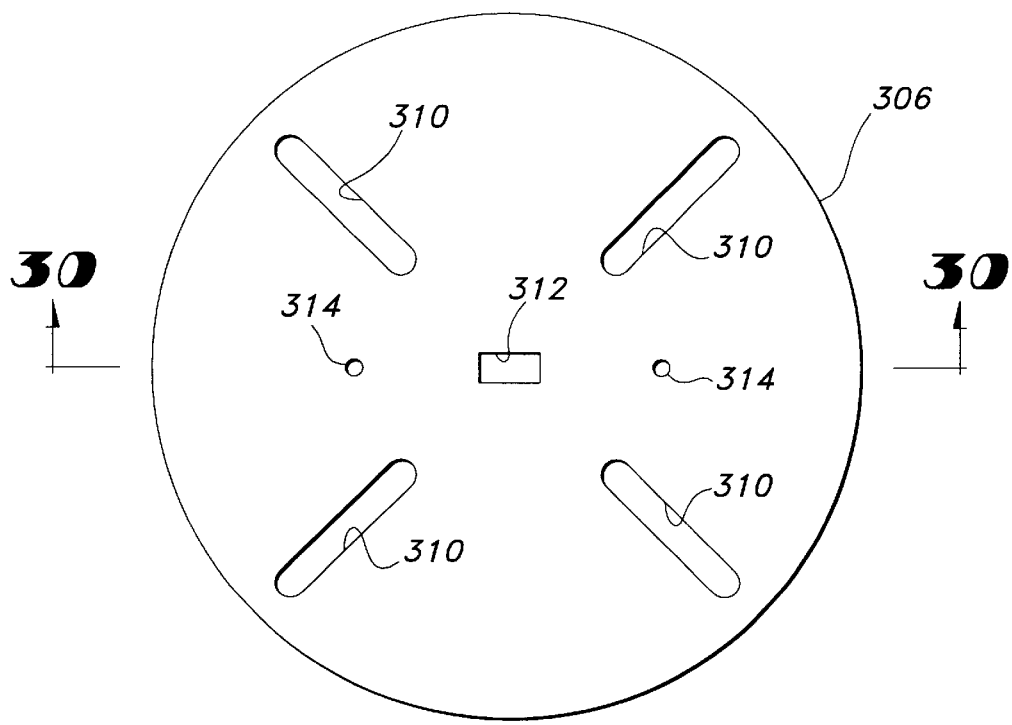
FIG. 29 is a plan view of a junction box cover plate included in the quick connect light fixture illustrated in FIG. 26.
Figure 30:
FIG. 30 is a cross-sectional view taken along line 30—30 in FIG. 29.

FIG. 26 illustrates a quick connect light fixture 300 according to a fifth embodiment of the present invention. In this embodiment, the light fixture 300 comprises a ceiling-mounted light fixture and is mounted to a junction box 302 disposed in a ceiling 304 of a residential or commercial structure. Alternatively, light fixture 300 may be mounted directly to the ceiling 304 of the residential or commercial structure. Due to the similarities of the various included features, the quick connect light fixture will be compared to light fixture 220 discussed previously, rather than light fixture 14. The quick connect light fixture 300 includes the following components which are common with the quick connect light fixture 220 and therefore include the features described previously: open-ended bracket 150 and male electrical connector 42 attached thereto; hollow rod 152; housing or canopy 222; locking member 224; globe-supporting structure 228; globe 230; clip 234; light socket 240; light bulb 242; and the associated fasteners. Additionally, the foregoing components are connected to one another as described previously with respect to light fixture 220. However, light fixture 300 differs from light fixture 220 in the following regards. In the first instance, light fixture 300 is not attached to the switch housing 40 of ceiling fan 12, but instead is attached to the junction box 302 having a conventional structure well known in the art, which is mounted in the ceiling 304 of a residential or commercial structure. Alternatively, the quick connect light fixture 300 may be mounted directly to the ceiling 304 of the residential or commercial structure. In order to accommodate application as a ceiling-mounted light fixture, the quick connect light fixture 300 further includes a junction box cover plate 306 disposed adjacent to the junction box 302 of the structure as shown in FIG. 26. Plate 306 is further illustrated in FIGS. 29 and 30. Additionally, the quick connect light fixture 300 further includes an adapter plate 308 which replaces the adapter plate 100 of the quick connect light fixture 220. The adapter plate 308 is illustrated in FIGS. 26–28. Adapter plate 308 and the junction box cover plate 306 are fastened to one another and are fastened to the junction box 302 mounted in the ceiling 304 of the residential or commercial structure, via conventional fasteners (not shown) which pass through openings formed in plates 308 and 306. In the illustrative embodiment, the junction box cover plate 306 comprises a substantially circular plate, but other shapes may be used within the scope of the present invention. Plate 306 includes a plurality of circumferentially spaced slots 310 which accept conventional fasteners used to attach plate 306 to the junction box 302. Slots 310 are elongated which facilitates aligning cover plate 306 to the junction box 302, so as to obtain the desired orientation of the quick connect light fixture 300. In the illustrative embodiment, plate 306 includes four of the slots 310 which have a generally race track shape and pass through plate 306. However, slots 310 may assume other shapes and other quantities of slots 310 may be used. Plate 306 further includes a centrally disposed aperture 312 which is effective for passing the electrical wires 98 from the female electrical connector 44 through plate 306 so that they may be spliced as required with the electrical wires associated with the electrical power source in the residential or commercial structure in which light fixture 300 is installed. In the illustrative embodiment, aperture 312 has a generally rectangular shape, but may assume other shapes as well. The junction box cover plate 306 further includes a pair of threaded holes 314 which are used to attach adapter plate 308 to cover plate 306.

Adapter plate 308 includes a first portion 316 which is substantially flat and is substantially the same as the first portion 102 of adapter plate 100 of the quick connect light fixture 220. The substantially flat first portion 316 of plate 308 is disposed in contacting engagement with the junction box cover plate 306 as shown in FIG. 26, and is attached thereto. The first portion 316 of plate 308 includes a pair of embossments 318 and associated counterbores 320 and holes 322 which serve the same function as embossments 110, counterbores 112 and holes 114 of adapter plate 100 discussed previously, i.e., to receive fasteners, such as screws or bolts 116 (shown in FIGS. 9 and 10) for the purpose of fastening the female electrical connector 44 to plate 308. The first portion 316 of plate 308 further includes a pair of clearance holes 324 which are effective for receiving fasteners (not shown) which are threaded into holes 314 of plate 306, to attach plate 308 to plate 306. Furthermore, the first portion 316 of plate 308 includes a generally centrally disposed aperture 326 which is substantially the same as aperture 118 of adapter plate 100 and is effective for receiving the wires 98 of the female electrical connector 44. Also, plate 308 includes a pair of flanges 328 which are integral with the first portion 316 and extend therefrom. Flanges 328 are preferably the same as flanges 124 of adapter plate 100. Accordingly, flanges 328 include first 329 and second 331 sidewalls, separated by a web 333, with the sidewall 331 including a shoulder portion similar to shoulder 140 of flanges 124 of adapter plate 100, which serves the same function. Furthermore, the second sidewall 331 of each of the flanges 328 is tapered, defining a taper ranging from about three degrees to about ten degrees, relative to a plane substantially parallel to the substantially flat portion 316 of plate 308.

The adapter plate 308, which may also be referred to as a ceiling plate, further includes an annular arcuate portion 330 which is integral with the substantially flat first portion 316 of plate 308. The arcuate portion 330 is included in plate 308 primarily for the purpose of obscuring a radially outward portion of the junction box cover plate 306 from view, thereby assisting in providing an aesthetically pleasing appearance of the quick connect light fixture 300. The locking member or hollow sleeve 224 includes a threaded portion 226 as described previously. The hollow sleeve 224 is threaded onto hollow rod 152 until the canopy 222 is forced into contacting engagement with the ceiling plate 308 as shown in FIG. 26, thereby causing a force to be exerted on the lips 160 of bracket 150 and the flanges 328 of ceiling plate 308 which locks these elements to one another as discussed previously with respect to bracket 150 and adapter plate 100 of light fixture 220. Furthermore, when the locking member 224 and canopy 222 are in an installed position as shown in FIG. 26, the canopy 222 obscures the open-ended bracket 150 and a portion of the adapter or ceiling plate 308 from view.

It should be further understood that other configurations of light fixtures, such as those discussed previously with regard to the first, third and fourth embodiments may be mounted to a junction box or ceiling of a residential or commercial structure within the scope of the quick connect light fixture of the present invention by using the ceiling plate 308 and the junction box cover plate 306, in lieu of adapter plate 100.

Figure 31:
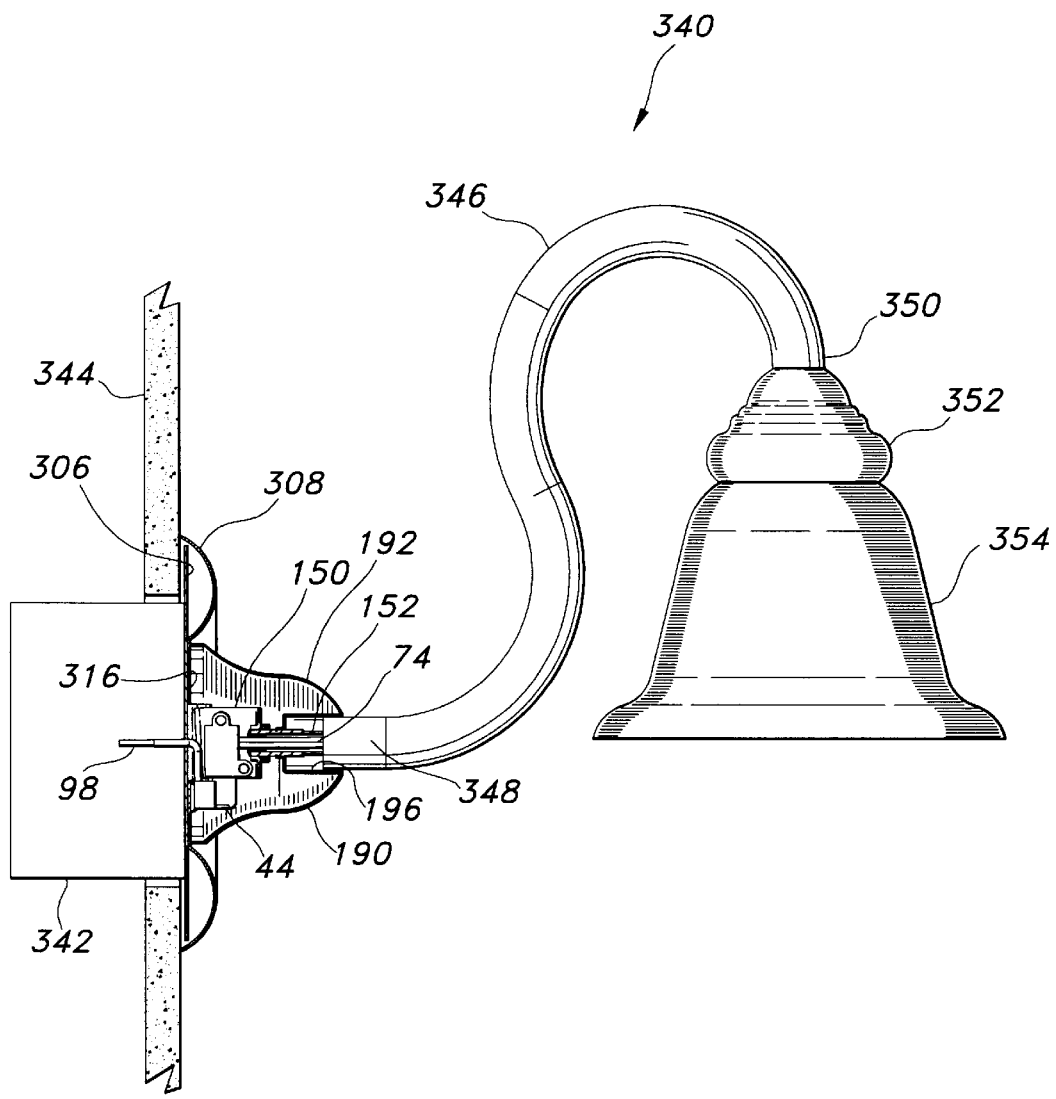
FIG. 31 is an elevational view, partially in cross-section, illustrating a quick connect light fixture according to a sixth embodiment of the present invention.

FIG. 31 illustrates a quick connect light fixture 340 according to a sixth embodiment of the present invention. In this embodiment, the light fixture 340 comprises a wall sconce which is attached to a junction box 342 mounted in a wall 344 of a residential or commercial structure. The quick connect light fixture 340 includes some components which are common with the quick connect light fixture 300 and other components which are common with the quick connect light fixture 14, as well as additional components, as subsequently described. More particularly, the quick connect light fixture 340 includes the following components which are common with light fixture 300: junction box cover plate 306 which is disposed adjacent to the junction box 342, and adapter plate 308, with plates 306 and 308 being attached to one another and plate 306 being attached to the junction box 342 via conventional fasteners (not shown). In this embodiment, the adapter plate 308 may be considered a wall plate, rather than a ceiling plate due to the attachment of light fixture 340 to junction box 342 mounted in wall 344. Additionally, light fixture 340 includes the female electrical connector 44 which is attached to plate 308 as discussed previously in conjunction with light fixture 300. Furthermore, the light fixture 340 includes the following components which are common with the quick connect light fixture 14 and therefore include the features described previously: open-ended bracket 150 and male electrical connector 42 attached thereto, and the associated fasteners; hollow rod 152; and canopy 190. The foregoing components which are common with light fixture 14 are connected to one another as described previously with respect to light fixture 14.

The quick connect light fixture 340 differs from both the quick connect light fixtures 14 and 300 in the following regards. Light fixture 340 includes a hollow mount arm 346 having a proximal end portion 348 threadedly secured to the hollow rod 152, thereby providing support for arm 346. Furthermore, the proximal end portion 348 of arm 346 extends as least partially into the receptacle 196 of canopy 190 for aesthetic purposes. In the illustrative embodiment shown in FIG. 31, the wall mount arm 348 is arcuately shaped and exhibits a generally S-shape in the elevation view shown. However, it should be understood that mount arm 346 may assume other shapes within the scope of the present invention. A distal end portion 350 of mount arm 346 is secured to a light fitter 352 by conventional means such as swaging or fasteners. The light fixture 340 further includes a light globe 354 which is secured to the light fitter 352. This may be accomplished by including mating threads on the light fitter 352 and the light globe 354 or by other suitable means, such as the use of thumb screws extending through the light fitter 352 into contacting engagement with a portion of light globe 354 disposed within light fitter 352. Light fixture 340 further includes a conventional light socket (not shown) secured to and disposed within the light fitter 352 and a conventional light bulb (not shown) installed in the light socket and disposed within the light globe 354. The electrical wires 74 coupled to the male electrical connector 42 are routed through hollow rod 152 and the hollow mount arm 346 to the light socket, thereby providing electrical power to the included light bulb.

When canopy 190 is threaded onto the hollow rod 152 in the installed position shown in FIG. 31, such that the edge 214 (not labeled in FIG. 31) of the shell portion 192 of canopy 190 is in contacting engagement with the substantially flat portion 316 of adapter plate 308, the canopy 190 exerts a force acting on the lips 160 (not shown in FIG. 31) of the open-ended bracket 150 and flanges 328 of adapter plate 308, thereby securely locking bracket 150 to adapter plate 308 so that the bracket 150 may not move relative to adapter plate 308. Accordingly, the male electrical connector 42 is securely engaged with the female electrical connector 44. The force exerted by the canopy 190 on the lips 160 of bracket 150 and flanges 328 of adapter plate 308 acts in a direction which is substantially parallel to a centerline (not shown) of the hollow rod 152, which corresponds to a substantially horizontal direction in the illustrative embodiment shown in FIG. 31. The canopy 190 obscures the open-ended bracket 150 and a portion of plate 308 from view when it is in the installed position shown in FIG. 31.

Due to the orientation of the bracket 150 and adapter plate 308, consistent with mounting the light fixture 340 to junction box 342, the tapers included on the lips 160 of bracket 150 in the flanges 328 of adapter plate 308 do not taper in a downward direction, from end to end, but rather taper in a horizontal direction. However, as may be appreciated, the action of gravity assists the installer in the mating engagement of bracket 150 with adapter plate 308. Furthermore, although the flanges 328 of plate 308 are preferably tapered for purposes of manufacturing commonality (i.e., since plate 308 is also used in the ceiling-mounted quick connect light fixture 300), it is not necessary to taper flanges 328 in this embodiment due to the orientation of light fixture 340. The same is true with regard to the lips 160 of bracket 150.

With regard to the quick connect light fixtures 220, 250, 270, 300 and 340 discussed previously, the various included locking members (comprising a canopy in fixture 220) and canopies or housings are preferably made of metal or a metal alloy, as well as the various included light fitters, whereas the various included light globes are preferably made of glass or plastic.

Figure 32:
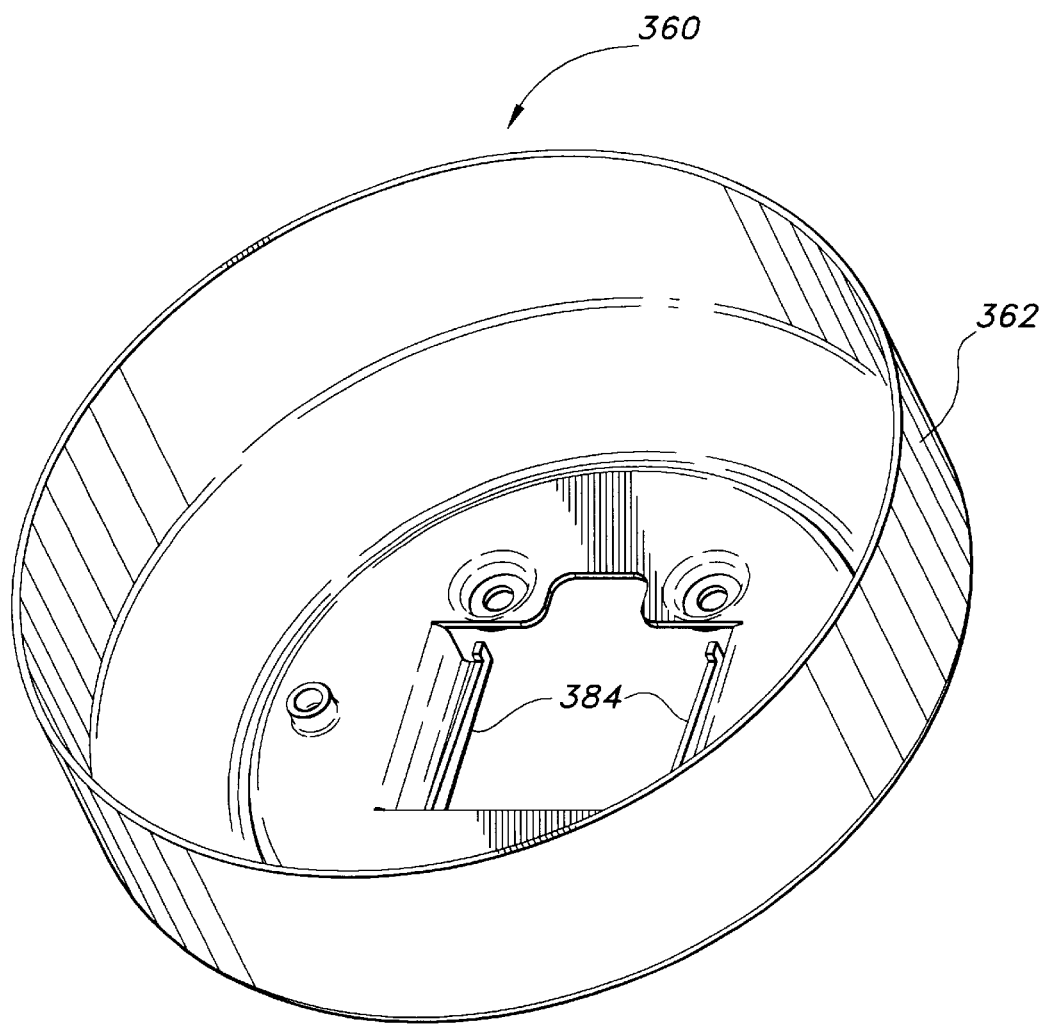
FIG. 32 is a perspective view illustrating a switch housing included in a quick connect light fixture according to a seventh embodiment of the present invention.
Figure 33:
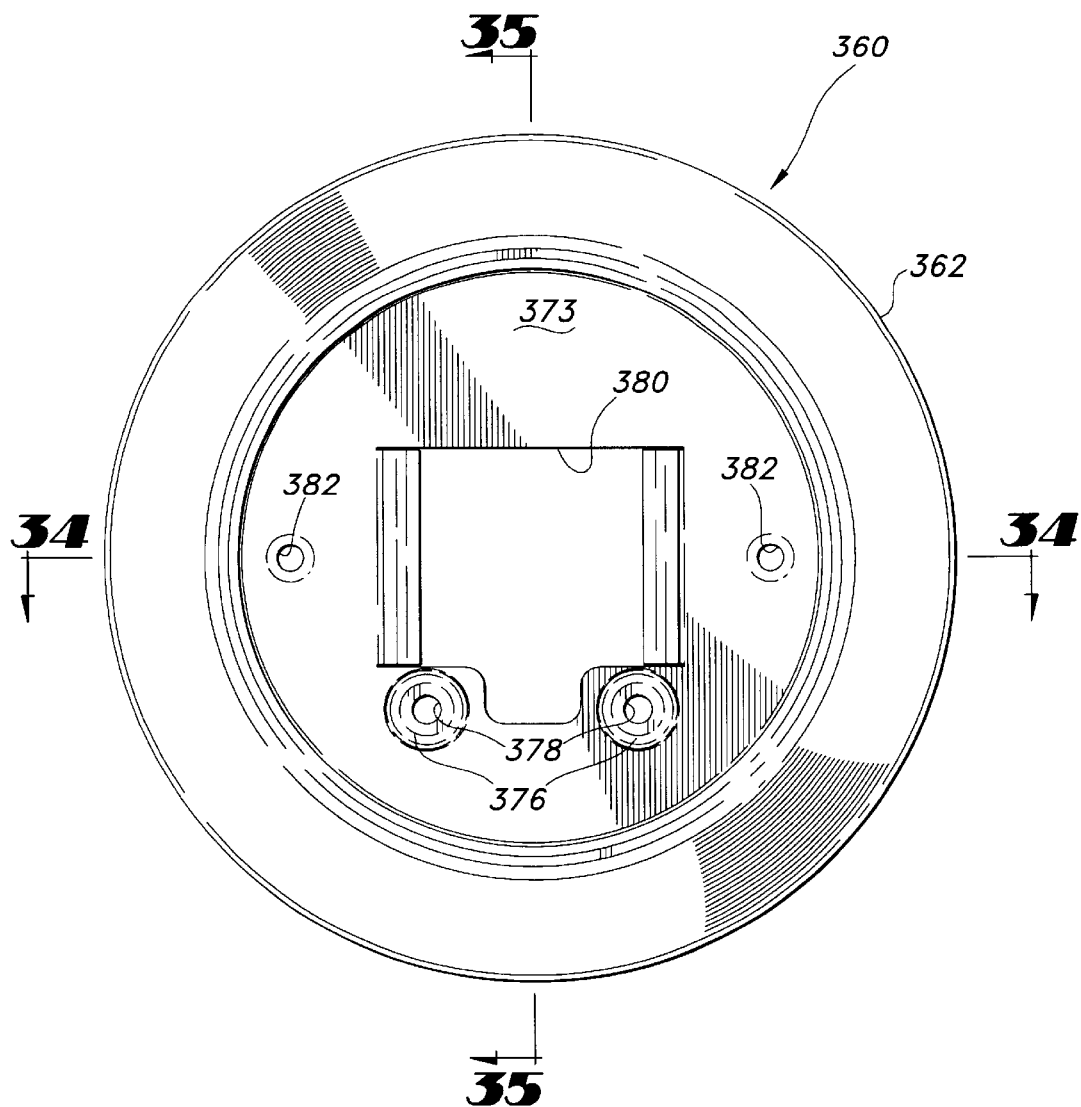
FIG. 33 is a top plan view of the switch housing shown in FIG. 32.
Figure 34:
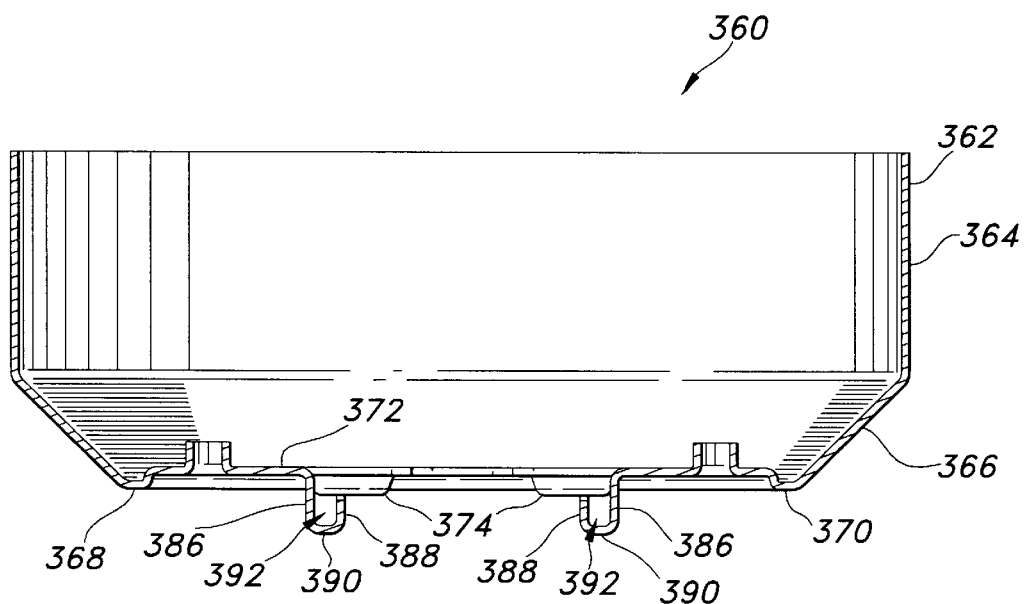
FIG. 34 is a cross-sectional view taken along line 34—34 in FIG. 33.
Figure 35:
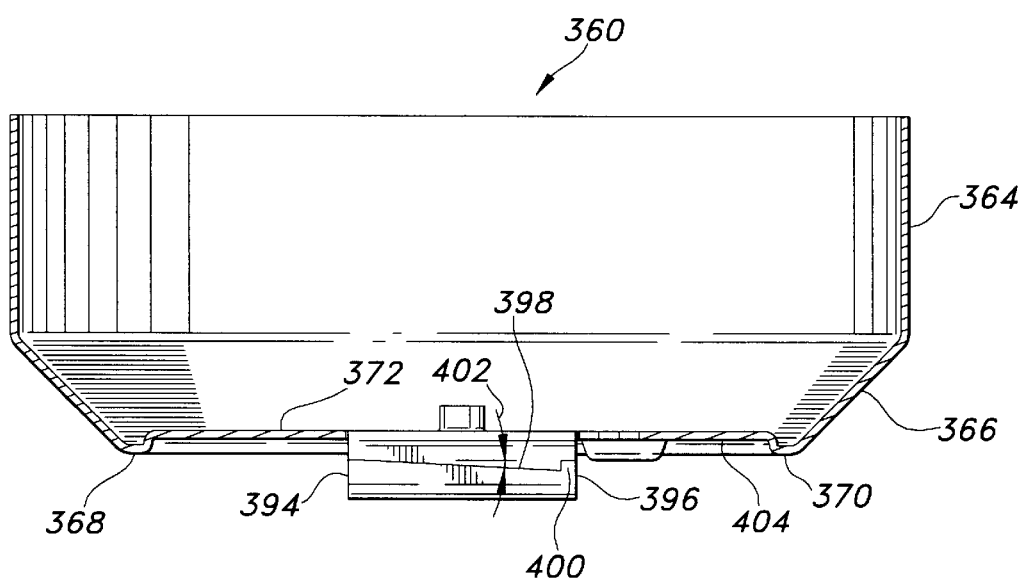
FIG. 35 is a cross-sectional view taken along line 35—35 in FIG. 33.

FIG. 32 is a perspective view of a switch housing 360 for a ceiling fan, which may be included in a quick connect light fixture according to a seventh embodiment of the present invention. Switch housing 360 is preferably made of metal or a metal alloy. In this embodiment, the switch housing 360 may be connected to the ceiling fan 12 in lieu of switch housing 40 discussed previously. The switch housing 360 is further illustrated in FIGS. 33–35 and, as best seen in FIGS. 34 and 35, switch housing 360 includes an annular sidewall 362 having a first, substantially cylindrical portion 364 and a second, tapered portion 366 integral with the substantially cylindrical portion 364. Switch housing 360 further includes a lower portion 368 having an annular lip 370 which is integral with the tapered portion 366 of sidewall 362, and an adapter plate 372 which is integral with the annular lip 370. The plate 372 of switch housing 360 includes a first portion 373 which is substantially the same as the first portion 102 of adapter plate 100 discussed previously in conjunction with quick connect light fixture 14. Accordingly, the first portion 373 of switch housing 360 includes various features which correspond with features of portion 102 of adapter plate 100 as subsequently discussed. More particularly, the first portion 373 of switch housing 360 includes: a pair of embossments 374 and associated counterbores 376 and holes 378 which correspond to embossments 110, counterbores 112 and holes 114 of adapter plate 100, respectively, and are effective for receiving fasteners (such as fasteners 116) to attach the female electrical connector 44 to the first portion 373 of adapter plate 372 of switch housing 360. Additionally, the first portion 373 of plate 372 includes an aperture 380, corresponding to aperture 118 of adapter plate 100, which is effective for receiving the electrical wires 98 coupled to the female electrical connector 44. Also, the first portion 373 of plate 372 may optionally include a pair of holes 382 to permit the user to mount a conventional light fixture to the switch housing 360, if the user wishes to do so. Sidewall 362 and adapter plate 372 of switch housing 360 are preferably integrally formed with one another, comprising a one-piece construction.

Adapter plate 372 further includes a pair of flanges 384 extending downwardly from the first portion 373 of plate 372. Each of the flanges 384 include first 386 and second 388 sidewalls which are separated by a web 390, with the sidewalls 386 and 388 and web portion 390 forming a channel 392. Each of the flanges 384 includes a first end 394 and a second end 396. The second sidewall 388 of each flange 384 includes an upper edge 398 which is configured to define a shoulder 400 proximate the second end 396 of flange 384, as best seen in FIG. 35. As shown in FIG. 35, the upper edge 398 is tapered between the first end 394 of flange 384 and the shoulder 400. More particularly, the upper edge 398 defines a taper 402 which preferably ranges from about three degrees to about ten degrees, relative to a plane which is substantially parallel to a substantially flat surface 404 of the first portion 373 of adapter plate 372. The foregoing features of the flanges 384 are the same as those of flanges 124 of adapter plate 100 discussed previously, and accordingly, function in the same manner.

As discussed previously, the switch housing 360 may be included in a quick connect light fixture according to a seventh embodiment of the present invention. This embodiment may have particular application for use with new ceiling fans, whereas the quick connect light fixtures 14, 220, 250 and 270 discussed previously may have particular application for the retrofitting of existing ceiling fans or combined ceiling fan and light fixtures. The remaining elements of this embodiment may be the same as those discussed and illustrated in previous embodiments of the present invention. For instance, the seventh embodiment of the present invention may include each of the elements of quick connect light fixture 14, with the exception of adapter plate 100 which is replaced by adapter plate 372 integrally formed with switch housing 360. Accordingly, in this instance, the open-ended bracket 150 would be slidingly engaged with the flanges 384 of adapter plate 372 of switch housing 360, with the remaining components connected to one another and functioning in the same manner as discussed previously with respect to light fixture 14.

The quick connect light fixture of the present invention has a variety of applications, as discussed previously, including the retrofitting of existing ceiling fans to provide a combined ceiling fan and light kit, use with new ceiling fans, or alternatively application as a ceiling-mounted light fixture or a wall sconce. In each instance, the quick connect light fixture of the present invention may include a variety of configurations which gives the end user a wide variety of choices to compliment the decor of the structure in which the quick connect light fixture is installed. With each configuration, the quick connect light fixture of the present invention includes mating electrical connectors which are designed for "quick connect" coupling in a simple, safe and reliable manner, thereby eliminating the need for an electrician's assistance in many instances. Furthermore, the various features of the quick connect light fixture of the present invention permits an end user to simply, safely and quickly disconnect and remove a portion of the light fixture for bulb replacement as required, or to change the appearance of the light fixture, for instance for special occasions. The structural elements of the quick connect light fixture to which the electrical connectors are attached have mating flanges which slidingly engage one another, for ease of installation, and the light fixture of each embodiment includes a locking member which secures the structural elements supporting the electrical connectors to one another.

While the foregoing description has set forth the preferred embodiments of the present invention in particular detail, it must be understood that numerous modifications, substitutions and changes can be undertaken without departing from the true spirit and scope of the present invention as defined by the ensuing claims. The invention is therefore not limited to specific preferred embodiments as described, but is only limited as defined by the following claims.

What is claimed is:

1. A quick connect light fixture for mounting to a structure, said quick connect light fixture comprising:

an adapter plate, including a first portion having first and second surfaces, which may be affixed to the structure such that said first surface of said first portion of said plate is facing the structure, said adapter plate further including a pair of flanges spaced apart from one another and protruding from said first portion of said plate, each of said flanges being configured to define a channel, said adapter plate further including an aperture extending between said flanges and through said first and second surfaces;

an open-ended bracket having a web and a pair of sidewalls, each of said sidewalls having a proximal portion integral with said web and a distal portion which comprises a lip, said sidewalls and said web defining a cavity;

a hollow rod secured to said bracket, at least a portion of said hollow rod having external threads;

a first electrical connector secured to said adapter plate;

a first plurality of electrical wires electrically coupled to said first electrical connector and extending through said aperture in said plate;

a second electrical connector secured to said open-ended bracket and disposed within said cavity; and a second plurality of electrical wires electrically coupled to said second electrical connector and extending through said hollow rod; wherein one of said first and second electrical connectors is a male electrical connector and the other of said first and second electrical connectors is a female electrical connector;

said lips of said sidewalls of said bracket slidingly engage said flanges of said adapter plate, with a distal portion of said lips of said sidewalls being disposed within said channels defined by said flanges, whereby said male electrical connector engages said female electrical connector; and wherein said quick connect light fixture further includes a locking member releasably secured to said hollow rod, said locking member being threaded onto said hollow rod which creates a locking force between said lips of said sidewalls of said bracket and said flanges of said adapter plate when said locking member is in an installed position, thereby preventing said bracket from moving relative to said adapter plate.

2. The quick connect light fixture as recited in claim 1, wherein said light fixture is attached to a ceiling fan including a switch housing, the switch housing having a substantially flat lower surface, and wherein:

said adapter plate is fastened to the switch housing whereby said first surface of said first portion of said adapter plate is disposed in contacting engagement with the lower surface of the switch housing.

3. The quick connect light fixture as recited in claim 2, wherein:

said locking member comprises a canopy which obscures said adapter plate and said open-ended bracket from view when said canopy is disposed in an installed position;

said canopy includes a shell portion which defines an interior cavity and a receptacle portion integral with said shell portion and disposed within said interior cavity;

said receptacle is configured to permit said hollow rod to extend therethrough, said receptacle having a threaded portion for threadedly engaging said hollow rod.

4. The quick connect light fixture as recited in claim 3, wherein:

said at least a portion of said hollow rod having external threads comprises first and second threaded portions which are longitudinally spaced from one another.

5. The quick connect light fixture as recited in claim 4, wherein:

said hollow rod further includes a non-threaded portion which is disposed between said first and second threaded portions, said threaded portion of said receptacle of said canopy being disposed in surrounding relationship with said non-threaded portion of said hollow rod when said canopy is in a pre-installed position, said threaded portion of said receptacle being threadedly engaged with said first threaded portion of said hollow rod and said canopy being in abutting relationship with the switch housing of the ceiling fan when said canopy is in said installed position.

6. The quick connect light fixture as recited in claim 3, further comprising:

a distributor;

at least one light globe; and at least one hollow mount arm having a first portion connected to and supported by said distributor and a second portion connected to and supporting said light globe;

wherein said hollow rod is secured to said distributor, said second plurality of wires being routed through said hollow rod to said distributor.

7. The quick connect light fixture as recited in claim 3, wherein:

said canopy has a generally bell-shaped cross-section.

8. The quick connect light fixture as recited in claim 6, wherein:

said at least one light globe comprises a plurality of light globes;

said at least one hollow mount arm comprises a plurality of hollow mount arms, each of said mount arms being connected to and supporting one of said light globes.

9. The quick connect light fixture as recited in claim 6, further comprising:

a hollow sleeve disposed in surrounding relationship with said hollow rod and extending between said canopy and said distributor;

wherein said sleeve extends into said receptacle of said canopy when said canopy is in a first, pre-installed position and a second, installed position.

10. The quick connect light fixture as recited in claim 2, further comprising:
a canopy disposed between and in abutting relationship with the switch housing of the ceiling fan and said locking member.

11. The quick connect light fixture as recited in claim 10, wherein:
said locking member forces said canopy into contacting engagement with the switch housing of the ceiling fan when said locking member is threaded onto said hollow rod and is disposed in an installed position, whereby said canopy obscures said adapter plate and said open-ended bracket from view.

12. The quick connect light fixture as recited in claim 10, wherein:
said locking member comprises a hollow sleeve disposed in surrounding relationship with said hollow rod.

13. The quick connect light fixture as recited in claim 10, further comprising:
a light globe; and
a globe-supporting structure;
wherein said at least a portion of said hollow rod having external threads comprises a first threaded portion secured to said open-ended bracket and a second threaded portion secured to said globe-supporting structure, said globe being secured to said globe-supporting structure.

14. The quick connect light fixture as recited in claim 13, wherein:
said light globe has an open top and an upper edge which is disposed radially outwardly of said switch housing so as to obscure the switch housing from view by an observer positioned below the ceiling fan.

15. The quick connect light fixture as recited in claim 13, further comprising:
a light socket secured to said canopy and disposed within said light globe.

16. The quick connect light fixture as recited in claim 10, further comprising:
a light socket; and
a light globe, said light socket being disposed within said light globe;
wherein said at least a portion of said hollow rod having external threads comprises a first threaded portion secured to said open-ended bracket and a second threaded portion secured to said light socket.

17. The quick connect light fixture as recited in claim 16, wherein:
said canopy includes first and second shell portions integral with one another;
said light globe is secured to said second shell portion of said canopy.

18. The quick connect light fixture as recited in claim 17, wherein:
said first shell portion of said canopy is upwardly facing;
said second shell portion of said canopy is downwardly facing and is disposed radially outward of said first shell portion.

19. The quick connect light fixture as recited in claim 10, wherein:
said hollow rod is threadedly secured to said open-ended bracket and said locking member.

20. The quick connect light fixture as recited in claim 19, wherein:
said locking member comprises a finial.

21. The quick connect light fixture as recited in claim 19, further comprising:
a plurality of light fitters secured to and extending outwardly from said canopy;
a plurality of light globes, each of said light globes being secured to one of said light fitters.

22. The quick connect light fixture as recited in claim 21, wherein:
each of said light fitters is staked to said canopy.

23. The quick connect light fixture as recited in claim 1, wherein said quick connect light fixture is attached to a junction box mounted to a ceiling of a residential or commercial structure, said quick connect light fixture further comprising:
a junction box cover plate disposed adjacent to the junction box of the structure;
a canopy disposed between said locking member and said adapter plate, said adapter plate comprising a ceiling plate;
wherein said junction box cover plate is attached to the junction box of the structure and said ceiling plate is attached to said junction box cover plate.

24. The quick connect light fixture as recited in claim 23, wherein:
said locking member forces said canopy into contacting engagement with said ceiling plate when said locking member is threaded onto said hollow rod and is disposed in an installed position whereby said canopy obscures said open-ended bracket and a portion of said ceiling plate from view.

25. The quick connect light fixture as recited in claim 23, wherein:
said locking member comprises a hollow sleeve disposed in surrounding relationship with said hollow rod.

26. The quick connect light fixture as recited in claim 25, further comprising:
a light globe; and
a globe-supporting structure;
wherein said at least a portion of said hollow rod having external threads comprises a first threaded portion secured to said open-ended bracket and a second threaded portion secured to said globe-supporting structure, said globe being secured to said globe-supporting structure.

27. The quick connect light fixture as recited in claim 26, wherein:
said light globe has an open top and an upper edge which is disposed radially outwardly of said ceiling plate.

28. The quick connect light fixture as recited in claim 23, wherein:
said first portion of said ceiling plate is substantially flat and is disposed in contacting engagement with said junction box cover plate;
said ceiling plate further includes an annular arcuate portion integral with said substantially flat portion and obscuring a radially outward portion of said junction box cover plate from view.

29. The quick connect light fixture as recited in claim 1, wherein said quick connect light fixture is attached to a junction box mounted in a wall of a residential or commercial structure, said quick connect light fixture further comprising:

a junction box cover plate disposed adjacent to the junction box of the structure, wherein said junction box cover plate is attached to the junction box of the structure and said adapter plate is attached to said junction box cover plate;

a light fitter;

a light globe secured to said light fitter; and a hollow mount arm having one end secured to said hollow rod and the other end secured to said light fitter.

30. The quick connect light fixture as recited in claim 29, wherein:

said locking member comprises a canopy which obscures said open-ended bracket and a portion of said adapter plate from view when said canopy is disposed in an installed position;

said canopy includes a shell portion which defines an interior cavity and a receptacle portion integral with said shell portion and disposed within said interior cavity;

said receptacle is configured to permit said hollow rod to extend therethrough, said receptacle having a threaded portion for threadedly engaging said hollow rod, wherein a portion of said hollow mount arm is disposed within said receptacle.

31. The quick connect light fixture as recited in claim 1, wherein:

said lip of each said sidewalls of said open-ended bracket is tapered relative to said web of said open-ended bracket.

32. The quick connect light fixture as recited in claim 31, wherein:

each of said flanges of said adapter plate includes a tapered portion, said tapered portion being tapered relative to said first surface of said adapter plate, said tapered portion engaging said tapered lip of said open-ended bracket.

33. The quick connect light fixture as recited in claim 1, wherein:

said first electrical connector is said female electrical connector and said second electrical connector is said male electrical connector.

34. The quick connect light fixture as recited in claim 1, wherein:

said first electrical connector is fastened to said adapter plate; and said second electrical connector is fastened to said open-ended bracket.

35. The quick connect light fixture as recited in claim 33, wherein:

said male and female electrical connectors each include a housing with a plurality of electrical terminals disposed therein.

36. The quick connect light fixture as recited in claim 35, wherein:

said housing of said male electrical connector includes a plurality of lead-in chamfers formed on an interior surface of said housing to facilitate engagement with said housing of said female electrical connector.

37. The quick connect light fixture as recited in claim 36, wherein:

said housing of said female electrical connector includes a plurality of lead-in chamfers formed on an exterior surface of said housing to facilitate engagement with said housing of said male electrical connector.

38. The quick connect light fixture as recited in claim 1, wherein each of said flanges of said adapter plate has a generally J-shaped cross-section and comprises:

a first sidewall which extends downwardly from said first portion of said adapter plate;

a web integral with said first sidewall and extending transversely to said first sidewall; and a second sidewall spaced apart from first said sidewall, said second sidewall being integral with and extending upwardly from said web.

39. The quick connect light fixture as recited in claim 38, wherein:

each of said flanges of said adapter plate further includes:

first and second ends;

said second sidewall of each of said flanges includes an upper edge which is configured to define a shoulder proximate said second end of the corresponding one of said flanges, said shoulder being disposed in abutting relationship with said lip of one of said sidewalls of said open-ended bracket;

said upper edge defines a downward taper between said first end and said shoulder.

40. The quick connect light fixture as recited in claim 39, wherein:

said taper ranges from about 3 degrees to about 10 degrees.

41. The quick connect light fixture as recited in claim 39, wherein:

each of said lips of said open-ended bracket is tapered.

42. The quick connect light fixture as recited in claim 1, wherein said light fixture is attached to a ceiling fan including a switch housing, wherein:

said adapter plate comprises a portion of the switch housing of the ceiling fan, said adapter plate being integrally formed with a remaining portion of the switch housing.

* * * * *